(12) United States Patent
Jurgenson et al.

(10) Patent No.: US 10,102,680 B2
(45) Date of Patent: Oct. 16, 2018

(54) IMAGE BASED TRACKING IN AUGMENTED REALITY SYSTEMS

(71) Applicant: Snap Inc., Venice, CA (US)

(72) Inventors: Nathan Jurgenson, Venice, CA (US); Linjie Luo, Playa Vista, CA (US); Jonathan M Rodriguez, II, Los Angeles, CA (US); Rahul Bhupendra Sheth, Los Angeles, CA (US); Jia Li, Marina Del Ray, CA (US); Xutao Lv, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/830,965

(22) Filed: Dec. 4, 2017

(65) Prior Publication Data

US 2018/0089904 A1 Mar. 29, 2018

Related U.S. Application Data

(63) Continuation of application No. 15/591,887, filed on May 10, 2017, now Pat. No. 9,836,890, which is a
(Continued)

(51) Int. Cl.
*G06T 19/00* (2011.01)
*G06T 7/20* (2017.01)
(Continued)

(52) U.S. Cl.
CPC ............ *G06T 19/006* (2013.01); *G06F 3/012* (2013.01); *G06F 3/04815* (2013.01);
(Continued)

(58) Field of Classification Search
CPC ......... G06T 7/73; G06T 7/246; G06T 7/0044; G06T 13/80; G06T 19/006;
(Continued)

(56) References Cited

U.S. PATENT DOCUMENTS 4,581,634 A 4/1986 Williams
4,975,690 A 12/1990 Torres
(Continued)

FOREIGN PATENT DOCUMENTS

CA 2887596 A1 7/2015
EP 2051480 A1 4/2009
(Continued)

OTHER PUBLICATIONS

"A Whole New Story", [Online]. Retrieved from the Internet: <https://www.snap.com/en-US/news/>, (2017), 13 pgs.
(Continued)

*Primary Examiner* — Manav Seth
(74) *Attorney, Agent, or Firm* — Schwegman Lundberg & Woessner, P.A.

(57) ABSTRACT

Systems and methods for image based location estimation are described. In one example embodiment, a first positioning system is used to generate a first position estimate. A set of structure façade data describing one or more structure façades associated with the first position estimate is then accessed. A first image of an environment is captured, and a portion of the image is matched to part of the structure façade data. A second position is then estimated based on a comparison of the structure façade data with the portion of the image matched to the structure façade data.

20 Claims, 17 Drawing Sheets

Related U.S. Application Data continuation of application No. 14/954,090, filed on Nov. 30, 2015, now Pat. No. 9,652,896.

(60) Provisional application No. 62/248,706, filed on Oct. 30, 2015.

(51) Int. Cl.

| | | |
|---|---|---|
| *G06T 13/80* | (2011.01) | |
| *G06F 3/0481* | (2013.01) | |
| *G06T 19/20* | (2011.01) | |
| *G06T 7/73* | (2017.01) | |
| *G06F 3/01* | (2006.01) | |
| *G06K 9/00* | (2006.01) | |
| *G06K 9/78* | (2006.01) | |
| *G06T 7/246* | (2017.01) | |

(52) U.S. Cl.
CPC ..... *G06K 9/00624* (2013.01); *G06K 9/00671* (2013.01); *G06K 9/78* (2013.01); *G06T 7/20* (2013.01); *G06T 7/246* (2017.01); *G06T 7/73* (2017.01); *G06T 13/80* (2013.01); *G06T 19/20* (2013.01); *G06K 2209/21* (2013.01); *G06T 2200/04* (2013.01); *G06T 2207/30244* (2013.01)

(58) Field of Classification Search
CPC ....... G06T 2200/04; G06T 19/20; G06T 7/20; G06T 2219/2004; G06T 2207/30244; G06T 7/004; G06K 9/00624; G06K 9/78; G06K 9/00671; G06K 2209/21; G06K 9/00664; G06F 3/012; G06F 19/12; G06F 3/04815; G06F 3/0346; G06F 3/04883
See application file for complete search history.

(56) References Cited

U.S. PATENT DOCUMENTS

| | | | |
|---|---|---|---|
| 5,072,412 A | | 12/1991 | Henderson, Jr. et al. |
| 5,493,692 A | | 2/1996 | Theimer et al. |
| 5,699,444 A | * | 12/1997 | Palm ..................... G01C 11/06 348/42 |
| 5,713,073 A | | 1/1998 | Warsta |
| 5,754,939 A | | 5/1998 | Herz et al. |
| 5,855,008 A | | 12/1998 | Goldhaber et al. |
| 5,883,639 A | | 3/1999 | Walton et al. |
| 6,012,098 A | | 1/2000 | Bayeh et al. |
| 6,014,090 A | | 1/2000 | Rosen et al. |
| 6,029,141 A | | 2/2000 | Bezos et al. |
| 6,038,295 A | | 3/2000 | Mattes |
| 6,049,711 A | | 4/2000 | Yehezkel et al. |
| 6,205,432 B1 | | 3/2001 | Gabbard et al. |
| 6,285,381 B1 | | 9/2001 | Sawano et al. |
| 6,285,987 B1 | | 9/2001 | Roth et al. |
| 6,317,789 B1 | | 11/2001 | Rakavy et al. |
| 6,349,203 B1 | | 2/2002 | Asaoka et al. |
| 6,446,004 B1 | | 9/2002 | Cao et al. |
| 6,449,657 B2 | | 9/2002 | Stanbach et al. |
| 6,456,852 B2 | | 9/2002 | Bar et al. |
| 6,523,008 B1 | | 2/2003 | Avrunin |
| 6,542,749 B2 | | 4/2003 | Tanaka et al. |
| 6,549,768 B1 | | 4/2003 | Fraccaroli |
| 6,618,593 B1 | | 9/2003 | Drutman et al. |
| 6,622,174 B1 | | 9/2003 | Ukita et al. |
| 6,658,095 B1 | | 12/2003 | Yoakum et al. |
| 6,668,173 B2 | | 12/2003 | Greene |
| 6,684,257 B1 | | 1/2004 | Camut et al. |
| 6,698,020 B1 | | 2/2004 | Zigmond et al. |
| 6,700,506 B1 | | 3/2004 | Winkler |
| 6,834,195 B2 | | 12/2004 | Brandenberg et al. |
| 6,836,792 B1 | | 12/2004 | Chen |
| 6,898,626 B2 | | 5/2005 | Ohashi |
| 6,970,088 B2 | | 11/2005 | Kovach |
| 6,980,909 B2 | | 12/2005 | Root et al. |
| 7,020,494 B2 | | 3/2006 | Spriestersbach et al. |
| 7,085,571 B2 | | 8/2006 | Kalhan et al. |
| 7,110,744 B2 | | 9/2006 | Freeny, Jr. |
| 7,173,651 B1 | | 2/2007 | Knowles |
| 7,203,380 B2 | | 4/2007 | Chiu et al. |
| 7,206,568 B2 | | 4/2007 | Sudit |
| 7,227,937 B1 | | 6/2007 | Yoakum et al. |
| 7,269,426 B2 | | 9/2007 | Kokkonen et al. |
| 7,315,823 B2 | | 1/2008 | Bröndrup |
| 7,394,345 B1 | | 7/2008 | Ehlinger et al. |
| 7,411,493 B2 | | 8/2008 | Smith |
| 7,423,580 B2 | | 9/2008 | Markhovsky et al. |
| 7,512,649 B2 | | 3/2009 | Faybishenko et al. |
| 7,535,890 B2 | | 5/2009 | Rojas |
| 7,607,096 B2 | | 10/2009 | Oreizy et al. |
| 7,639,943 B1 | | 12/2009 | Kalajan |
| 7,668,537 B2 | | 2/2010 | DeVries |
| 7,720,554 B2 | * | 5/2010 | DiBernardo ............ G01S 5/163 356/139.03 |
| 7,737,965 B2 | * | 6/2010 | Alter ...................... G01C 21/20 345/419 |
| 7,770,137 B2 | | 8/2010 | Forbes et al. |
| 7,779,444 B2 | | 8/2010 | Glad |
| 7,787,886 B2 | | 8/2010 | Markhovsky et al. |
| 7,796,946 B2 | | 9/2010 | Eisenbach |
| 7,801,954 B2 | | 9/2010 | Cadiz et al. |
| 8,082,255 B1 | | 12/2011 | Carlson, Jr. et al. |
| 8,099,109 B2 | | 1/2012 | Altman et al. |
| 8,131,597 B2 | | 3/2012 | Hudetz |
| 8,135,166 B2 | | 3/2012 | Rhoads |
| 8,136,028 B1 | | 3/2012 | Loeb et al. |
| 8,146,001 B1 | | 3/2012 | Reese |
| 8,161,417 B1 | | 4/2012 | Lee |
| 8,183,997 B1 | | 5/2012 | Wong et al. |
| 8,195,203 B1 | | 6/2012 | Tseng |
| 8,199,747 B2 | | 6/2012 | Rojas et al. |
| 8,208,943 B2 | | 6/2012 | Petersen |
| 8,214,443 B2 | | 7/2012 | Hamburg |
| 8,285,199 B2 | | 10/2012 | Hsu et al. |
| 8,306,922 B1 | | 11/2012 | Kunal et al. |
| 8,326,327 B2 | | 12/2012 | Hymel et al. |
| 8,332,475 B2 | | 12/2012 | Rosen et al. |
| 8,352,546 B1 | | 1/2013 | Dollard |
| 8,385,950 B1 | | 2/2013 | Wagner et al. |
| 8,423,409 B2 | | 4/2013 | Rao |
| 8,472,935 B1 | | 6/2013 | Fujisaki |
| 8,502,903 B2 | * | 8/2013 | Kashitani ................ G06F 3/011 348/222.1 |
| 8,510,383 B2 | | 8/2013 | Hurley et al. |
| 8,525,825 B2 | * | 9/2013 | Zhu ........................ G06T 15/06 345/419 |
| 8,527,345 B2 | | 9/2013 | Rothschild et al. |
| 8,554,627 B2 | | 10/2013 | Svendsen et al. |
| 8,564,710 B2 | * | 10/2013 | Nonaka .............. H04N 1/00244 348/116 |
| 8,660,358 B1 | | 2/2014 | Bergboer et al. |
| 8,660,793 B2 | | 2/2014 | Ngo et al. |
| 8,676,623 B2 | * | 3/2014 | Gale ....................... G01C 21/20 705/7.13 |
| 8,682,350 B2 | | 3/2014 | Altman et al. |
| 8,712,776 B2 | | 4/2014 | Bellegarda et al. |
| 8,718,333 B2 | | 5/2014 | Wolf et al. |
| 8,724,622 B2 | | 5/2014 | Rojas |
| 8,761,800 B2 | | 6/2014 | Kuwahara |
| 8,788,680 B1 | | 7/2014 | Naik |
| 8,790,187 B2 | | 7/2014 | Walker et al. |
| 8,797,415 B2 | | 8/2014 | Arnold |
| 8,798,646 B1 | | 8/2014 | Wang et al. |
| 8,874,677 B2 | | 10/2014 | Rosen et al. |
| 8,909,679 B2 | | 12/2014 | Root et al. |
| 8,909,725 B1 | | 12/2014 | Sehn |
| 8,933,966 B2 | * | 1/2015 | Oi ......................... G06T 19/006 345/633 |
| 8,995,433 B2 | | 3/2015 | Rojas |
| 9,031,283 B2 | * | 5/2015 | Arth ..................... G06K 9/00671 382/103 |
| 9,040,574 B2 | | 5/2015 | Wang et al. |

(56) References Cited

U.S. PATENT DOCUMENTS

| | | |
|---|---|---|
| 9,055,416 B2 | 6/2015 | Rosen et al. |
| 9,058,687 B2* | 6/2015 | Kruglick .............. G06T 19/006 |
| 9,098,926 B2* | 8/2015 | Quan ................ G06K 9/00704 |
| 9,100,806 B2 | 8/2015 | Rosen et al. |
| 9,100,807 B2 | 8/2015 | Rosen et al. |
| 9,123,074 B2 | 9/2015 | Jacobs |
| 9,129,432 B2* | 9/2015 | Quan ..................... G06T 17/05 |
| 9,143,681 B1 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,240,074 B2* | 1/2016 | Berkovich ................ G01S 5/16 |
| 9,258,459 B2 | 2/2016 | Hartley |
| 9,317,133 B2* | 4/2016 | Korah ................... G06T 19/006 |
| 9,317,921 B2* | 4/2016 | Chao .................... G06K 9/4604 |
| 9,355,123 B2* | 5/2016 | Wnuk ................ G06F 17/30247 |
| 9,361,283 B2* | 6/2016 | Jones ..................... G06F 17/241 |
| 9,385,983 B1 | 7/2016 | Sehn |
| 9,396,354 B1 | 7/2016 | Murphy et al. |
| 9,430,783 B1 | 8/2016 | Sehn |
| 9,443,227 B2 | 9/2016 | Evans et al. |
| 9,459,778 B2 | 10/2016 | Hogeg et al. |
| 9,465,816 B2* | 10/2016 | Johnson ............ G06F 17/30268 |
| 9,489,661 B2 | 11/2016 | Evans et al. |
| 9,491,134 B2 | 11/2016 | Rosen et al. |
| 9,495,783 B1* | 11/2016 | Samarasekera ......... G06T 11/60 |
| 9,537,811 B2 | 1/2017 | Allen et al. |
| 9,628,950 B1 | 4/2017 | Noeth et al. |
| 9,652,896 B1* | 5/2017 | Jurgenson ............. G06T 19/006 |
| 9,805,020 B2 | 10/2017 | Gorman et al. |
| 9,836,890 B2* | 12/2017 | Jurgenson ............. G06T 19/006 |
| 2002/0087631 A1 | 7/2002 | Sharma |
| 2002/0097257 A1 | 7/2002 | Miller et al. |
| 2003/0001846 A1 | 1/2003 | Davis et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0050785 A1 | 3/2003 | Friedrich et al. |
| 2003/0148773 A1 | 8/2003 | Spriestersbach et al. |
| 2003/0229607 A1 | 12/2003 | Zellweger et al. |
| 2004/0078367 A1 | 4/2004 | Anderson et al. |
| 2004/0158739 A1 | 8/2004 | Wakai et al. |
| 2004/0189465 A1 | 9/2004 | Capobianco et al. |
| 2004/0215625 A1 | 10/2004 | Svendsen et al. |
| 2005/0022211 A1 | 1/2005 | Veselov et al. |
| 2005/0048989 A1 | 3/2005 | Jung |
| 2005/0104976 A1 | 5/2005 | Currans |
| 2005/0119936 A1 | 6/2005 | Buchanan et al. |
| 2005/0122405 A1 | 6/2005 | Voss et al. |
| 2005/0162523 A1 | 7/2005 | Darrell et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0287878 A1 | 12/2006 | Wadhwa et al. |
| 2007/0004426 A1 | 1/2007 | Pfleging et al. |
| 2007/0073517 A1 | 3/2007 | Panje |
| 2007/0075898 A1 | 4/2007 | Markhovsky et al. |
| 2007/0136228 A1 | 6/2007 | Petersen |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0233556 A1 | 10/2007 | Koningstein |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0032703 A1 | 2/2008 | Krumm et al. |
| 2008/0043041 A2 | 2/2008 | Hedenstroem et al. |
| 2008/0076505 A1 | 3/2008 | Nguyen et al. |
| 2008/0092233 A1 | 4/2008 | Tian et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0214210 A1 | 9/2008 | Rasanen et al. |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0318616 A1 | 12/2008 | Chipalkatti et al. |
| 2009/0006191 A1 | 1/2009 | Arankalle et al. |
| 2009/0015703 A1 | 1/2009 | Kim et al. |
| 2009/0030774 A1 | 1/2009 | Rothschild et al. |
| 2009/0030999 A1 | 1/2009 | Gatzke et al. |
| 2009/0058822 A1 | 3/2009 | Chaudhri |
| 2009/0079846 A1 | 3/2009 | Chou |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132665 A1 | 5/2009 | Thomsen et al. |
| 2009/0157450 A1 | 6/2009 | Athsani et al. |
| 2009/0160970 A1 | 6/2009 | Fredlund et al. |
| 2009/0163182 A1 | 6/2009 | Gatti et al. |
| 2009/0192900 A1 | 7/2009 | Collison |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0293012 A1* | 11/2009 | Alter ....................... G01C 21/20 715/810 |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0113065 A1 | 5/2010 | Narayan et al. |
| 2010/0130233 A1 | 5/2010 | Lansing |
| 2010/0153144 A1 | 6/2010 | Miller et al. |
| 2010/0161658 A1 | 6/2010 | Hamynen et al. |
| 2010/0162149 A1 | 6/2010 | Sheleheda et al. |
| 2010/0185552 A1 | 7/2010 | Deluca et al. |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0250109 A1 | 9/2010 | Johnston et al. |
| 2010/0259386 A1 | 10/2010 | Holley et al. |
| 2010/0273509 A1 | 10/2010 | Sweeney et al. |
| 2011/0010205 A1 | 1/2011 | Richards |
| 2011/0029512 A1 | 2/2011 | Folgner et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0096093 A1* | 4/2011 | Oi ......................... G06T 19/006 345/633 |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0159890 A1 | 6/2011 | Fortescue et al. |
| 2011/0164163 A1 | 7/2011 | Bilbrey et al. |

(56) References Cited

U.S. PATENT DOCUMENTS

| | | |
|---|---|---|
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0270584 A1* | 11/2011 | Plocher ............... G06F 17/5004 703/1 |
| 2011/0273575 A1 | 11/2011 | Lee |
| 2011/0282799 A1 | 11/2011 | Huston |
| 2012/0150978 A1 | 1/2012 | Monaco |
| 2012/0036015 A1 | 2/2012 | Sheikh |
| 2012/0041722 A1* | 2/2012 | Quan ..................... G06T 17/05 703/1 |
| 2012/0059722 A1 | 3/2012 | Rao |
| 2012/0069233 A1* | 3/2012 | Nonaka ............. H04N 1/00244 348/333.02 |
| 2012/0086727 A1* | 4/2012 | Korah ..................... G06F 3/03 345/633 |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0122570 A1 | 5/2012 | Baronoff |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0165100 A1 | 6/2012 | Lalancette et al. |
| 2012/0169855 A1 | 7/2012 | Oh |
| 2012/0172062 A1 | 7/2012 | Altman et al. |
| 2012/0176401 A1 | 7/2012 | Hayward et al. |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0212632 A1 | 8/2012 | Mate et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0252418 A1 | 10/2012 | Kandekar et al. |
| 2012/0278387 A1 | 11/2012 | Garcia et al. |
| 2012/0304052 A1 | 11/2012 | Tanaka et al. |
| 2012/0307096 A1 | 12/2012 | Bray et al. |
| 2012/0307112 A1 | 12/2012 | Kunishige et al. |
| 2012/0314040 A1 | 12/2012 | Kopf et al. |
| 2013/0002649 A1 | 1/2013 | Wu et al. |
| 2013/0006759 A1 | 1/2013 | Srivastava et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0059607 A1 | 3/2013 | Herz et al. |
| 2013/0086072 A1 | 4/2013 | Peng et al. |
| 2013/0095857 A1 | 4/2013 | Garcia et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0159110 A1 | 6/2013 | Rajaram et al. |
| 2013/0169680 A1 | 7/2013 | Chien et al. |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0191198 A1 | 7/2013 | Carlson et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0232194 A1 | 9/2013 | Knapp et al. |
| 2013/0265450 A1 | 10/2013 | Barnes, Jr. |
| 2013/0267253 A1 | 10/2013 | Case et al. |
| 2013/0308822 A1* | 11/2013 | Marimon ................ G01S 5/16 382/103 |
| 2013/0311255 A1 | 11/2013 | Cummins et al. |
| 2013/0325964 A1 | 12/2013 | Berberat |
| 2014/0006129 A1 | 1/2014 | Heath |
| 2014/0019264 A1 | 1/2014 | Wachman et al. |
| 2014/0045530 A1 | 2/2014 | Gordon et al. |
| 2014/0047016 A1 | 2/2014 | Rao |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0064624 A1* | 3/2014 | Kim ..................... G06K 9/0063 382/201 |
| 2014/0081634 A1 | 3/2014 | Forutanpour |
| 2014/0086727 A1 | 3/2014 | Xu |
| 2014/0096029 A1 | 4/2014 | Schultz |
| 2014/0114565 A1 | 4/2014 | Aziz et al. |
| 2014/0125668 A1 | 5/2014 | Steed et al. |
| 2014/0129207 A1 | 5/2014 | Bailey et al. |
| 2014/0155102 A1 | 6/2014 | Cooper et al. |
| 2014/0173424 A1 | 6/2014 | Hogeg et al. |
| 2014/0214471 A1 | 7/2014 | Schreiner, III |
| 2014/0258405 A1 | 9/2014 | Perkin |
| 2014/0266703 A1 | 9/2014 | Dalley, Jr. et al. |
| 2014/0277735 A1 | 9/2014 | Breazeal |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0324627 A1 | 10/2014 | Haver et al. |
| 2014/0324629 A1 | 10/2014 | Jacobs |
| 2015/0040074 A1* | 2/2015 | Hofmann ............... G06T 19/006 715/852 |
| 2015/0087263 A1 | 3/2015 | Branscomb et al. |
| 2015/0088622 A1 | 3/2015 | Ganschow et al. |
| 2015/0116529 A1 | 4/2015 | Wu et al. |
| 2015/0169827 A1 | 6/2015 | Laborde |
| 2015/0172534 A1 | 6/2015 | Miyakawaa et al. |
| 2015/0222814 A1 | 8/2015 | Li et al. |
| 2015/0261917 A1 | 9/2015 | Smith |
| 2015/0350136 A1 | 12/2015 | Flynn, III et al. |
| 2016/0006927 A1 | 1/2016 | Sehn |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0277419 A1 | 9/2016 | Allen et al. |
| 2017/0006094 A1 | 1/2017 | Abou Mahmoud et al. |
| 2017/0124713 A1 | 5/2017 | Jurgenson et al. |
| 2017/0243371 A1 | 8/2017 | Jurgenson et al. |
| 2018/0005450 A1 | 1/2018 | Daniels et al. |

FOREIGN PATENT DOCUMENTS

| | | |
|---|---|---|
| EP | 2151797 A1 | 2/2010 |
| GB | 2399928 A | 9/2004 |
| KR | 19990073076 A | 10/1999 |
| KR | 20010078417 A | 8/2001 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050103 A3 | 7/2001 |
| WO | WO-2006118755 A2 | 11/2006 |
| WO | WO-2007092668 | 8/2007 |
| WO | WO-2009043020 A2 | 4/2009 |
| WO | WO-2011119407 A1 | 9/2011 |
| WO | WO-2013008238 | 1/2013 |
| WO | WO-2013008238 A1 | 1/2013 |
| WO | WO-2013045753 A1 | 4/2013 |
| WO | WO-2014006129 A1 | 1/2014 |
| WO | WO-2014115136 A1 | 7/2014 |
| WO | WO-2014194262 A2 | 12/2014 |
| WO | WO-2016065131 A1 | 4/2016 |
| WO | WO-2017075476 A1 | 5/2017 |

(56) References Cited

FOREIGN PATENT DOCUMENTS

OTHER PUBLICATIONS

"Adding a watermark to your photos", eBay, [Online]. Retrieved from the Internet:<URL:http://pages.ebay.com/help/sell/pictures.html>, (accessed May 24, 2017), 4 pgs.

"U.S. Appl. No. 14/053,913, filed Nov. 13, 2017 to Non Final Office Action dated Jun. 12, 2017", 11 pgs.

"U.S. Appl. No. 14/953,913, Non Final Office Action dated Jun. 12, 2017", 35 pgs.

"U.S. Appl. No. 14/953,913, Notice of Allowance dated Jan. 30, 2018", 23 pgs.

"U.S. Appl. No. 14/954,090, Corrected Notice of Allowance dated Feb. 3, 2017", 4 pgs.

"U.S. Appl. No. 14/954,090, Corrected Notice of Allowance dated Apr. 18, 2017", 4 pgs.

"U.S. Appl. No. 14/954,090, Notice of Allowance dated Jan. 11, 2017", 11 pgs.

"U.S. Appl. No. 14/954,090, Preliminary Amendment filed Dec. 28, 2016", 10 pgs.

"U.S. Appl. No. 15/437,018, Examiner Interview Summary dated Feb. 16, 2018", 3 pgs.

"U.S. Appl. No. 15/437,018, Non Final Office Action dated Jan. 26, 2018", 9 pgs.

"U.S. Appl. No. 15/591,887, Corrected Notice of Allowance dated Sep. 8, 2017", 4 pgs.

"U.S. Appl. No. 15/591,887, Notice of Allowance dated Aug. 25, 2017", 10 pgs.

"U.S. Appl. No. 15/591,887, Preliminary Amendment filed Jun. 12, 2017", 10 pgs.

"U.S. Appl. No. 15/591,887, PTO Response to Rule 312 Communication dated Sep. 19, 2017", 2 pgs.

"BlogStomp", [Online]. Retrieved from the Internet: <URL:http://stompsoftware.com/blogstomp>, (accessed May 24, 2017), 12 pgs.

"Cup Magic Starbucks Holiday Red Cups come to life with AR app", [Online]. Retrieved from the Internet: <http://www.blastradius.com/work/cup-magic>, (2016), 7 pgs.

"Daily App: InstaPlace (iOS/Android): Give Pictures a Sense of Place", TechPP, [Online]. Retrieved from the Internet: <URL;http://techpp.com/2013/02/15/instaplace-app-review>, (2013), 13 pgs.

"InstaPlace Photo App Tell the Whole Story"[Online]. Retrieved from the Internet; <https://youtu.be/uF_gFkg1hBM>, (Nov. 8, 2013), 113 pgs.

"International Application Serial No. PCT/US2015/037251, International Search Report dated Sep. 29, 2015", 2 pgs.

"International Application Serial No. PCT/US2016/059503, International Search Report dated Jan. 23, 2017", 4 pgs.

"International Application Serial No. PCT/US2016/059503, Written Opinion dated Jan. 23, 2017", 5 pgs.

"Introducing Snapchat Stories", [Online], Retrieved from the Internet:<https://www.youtube.com/watch?v=88Cu3yN-LIM>, (Oct. 3, 2013), 92 pgs.

"Macy's Believe-o-Magic", {Online}, Retrieved from the Internet: <https://www.youtube.com/watch?v=xvzRXy3J0Z0>, (Nov. 7, 2011), 102 pgs.

"Macy's Introduces Augmented Reality Experience in Stores across Country as Part of Its 2011 "Believe" Campaign", [Online]. Retrieved from the Internet: <http://www.businesswire.com/news/home/20111102006759/en/Macy%E2%80%99s-Introduces-Augmented-Reality-Experience-Stores-Country>., (Nov. 2, 2011), 6 pgs.

"Starbucks Cup Magic", {Onliine}. Retrieved from the Internet: <https://www.youtube.com/watch?v=RWwQXi9RG0w>, (Nov. 8, 2011), 87 pgs.

"Starbucks Cup Magic for Valentine's Day", {Online}. Retrieved from the Internet: <https://www.youtube.com/watch?v=8nvqOzjq10w>, (Feb. 6, 2012), 88 pgs.

"Starbucks Holiday Red Cups Come to Life, Signaling the Return of the Merriest Season", [Online]. Retrieved from the Internet: <http://www.businesswire.com/news/home/20111115005744/en/2479513/Starbucks-Holiday-Red-Cups-Life-Signaling-Return>, (Nov. 15, 2011), 5 pgs.

Carthy, Roi, "Dear All Photo Apps: Mobli Just Won Filters", [Online]. Retrieved from the Internet: URL<https://techcrunch.com/2011/09/08/mobli-filters>, (Sep. 8, 2011), 10 pgs.

Janthong, Isaranu, "Android App Review Thailand", [Online]. Retrieved from the Internet:<http://www.android-free-app-review.com/2013/01/instaplace-android-google-play-store.html>, (Jan. 23, 2013), 9 pgs.

Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.

MacLeod, Duncan, "Macys Believe-o-Magic App", [Online]. Retrieved from the Internet: <URL:http://theinspirationroom.com/daily/2011/macys-believe-o-magic-app>, (Nov. 14, 2011), 10 pgs.

MacLeod, Duncan, "Starbucks Cup Magic—Let's Merry", {Online}. Retrieved from the Internet: <URL; http://theinspirationroom.com/daily/2011/starbucks-cup-magic>, (Nov. 12, 2011), 8 pgs.

Notopoulos, Katie, "A Guide to the New Snapchat Filters and Big Fonts", [Online]. Retrieved from the Internet:<https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.

Panzarino, Matthew, "Snapchat Adds Filters, a Replay Function and for Whatever Reason, Time, Temperature and Speed Overlays", [Online]. Retrieved from the Internet: <https://techcrunch.com/2013/12/20/snapchat-adds-filters-new-font-and-for-some-reason-time-temperature-and-speed-overlays/>, (Dec. 20, 2013), 12 pgs.

Tripathi, Rohit, "Watermark Images in PHP and Save File on Server", [Online]. Retrieved from the Internet: <URL:http://code.rohitink.com/2012/12/28/watermark-images-in-php-and-save-file-on-server/, (Dec. 28, 2012), 4 pgs.

"International Application Serial No. PCT US2016 059503, International Preliminary Report on Patentability dated May 11, 2018", 7 pgs.

U.S. Appl. No. 15/971,566, filed May 4, 2018, Image and Point Cloud Based Tracking and in Augmented Reality Systems.

* cited by examiner

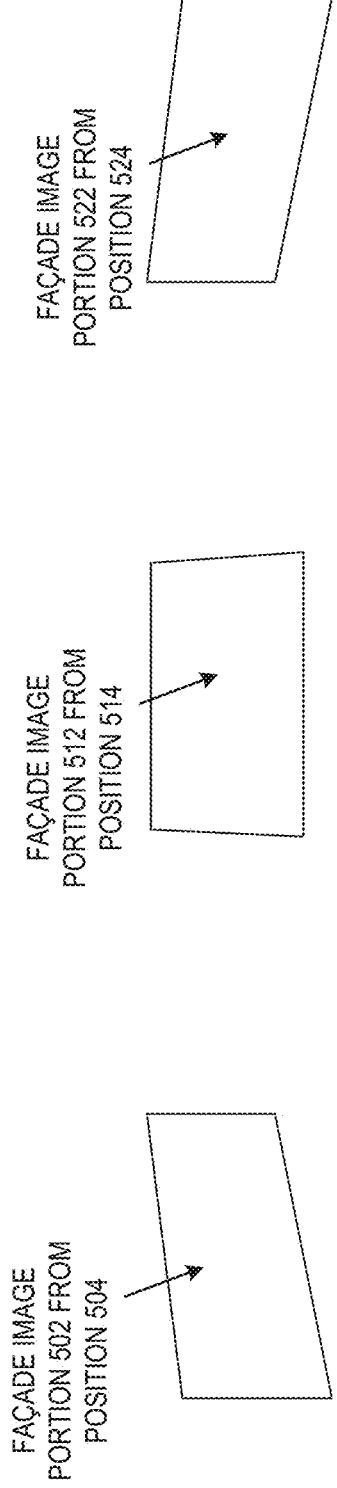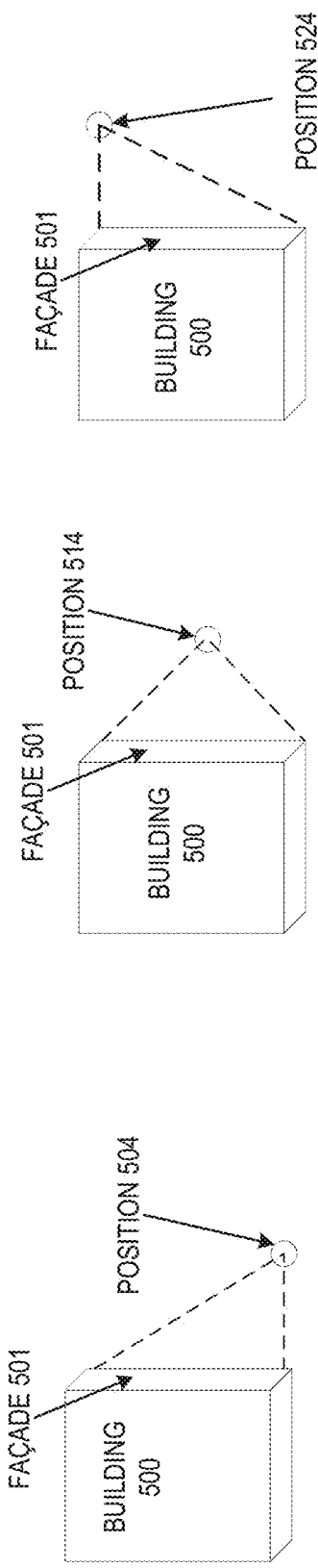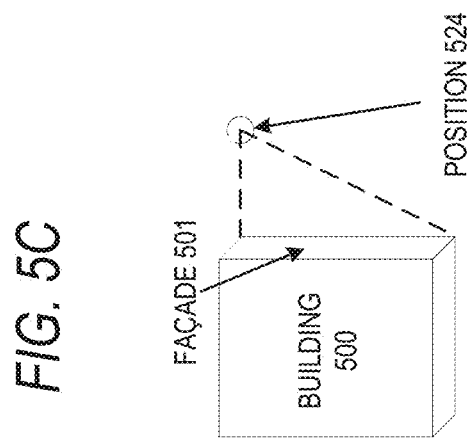
FAÇADE IMAGE PORTION 502 FROM POSITION 504
FIG. 5A
FAÇADE IMAGE PORTION 512 FROM POSITION 514
FIG. 5B
FAÇADE IMAGE PORTION 522 FROM POSITION 524
FIG. 5C
FAÇADE 501
BUILDING 500
POSITION 504
FIG. 5D
FAÇADE 501
BUILDING 500
POSITION 514
FIG. 5E
FAÇADE 501
BUILDING 500
POSITION 524
FIG. 5F

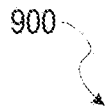

900

DETERMINING, USING A FIRST POSITIONING SYSTEM, A FIRST POSITION ESTIMATE FOR THE DEVICE
902

ACCESSING, BASED ON THE FIRST POSITION ESTIMATE, A SET OF STRUCTURE FACADE DATA DESCRIBING ONE OR MORE STRUCTURE FACADES ASSOCIATED WITH THE FIRST POSITION ESTIMATE
904

CAPTURING, BY AN IMAGE SENSOR OF THE DEVICE, A FIRST IMAGE OF AN ENVIRONMENT
906

IDENTIFYING, USING THE SET OF STRUCTURE FACADE DATA, A FIRST STRUCTURE FACADE PORTION OF THE FIRST IMAGE OF THE ENVIRONMENT, WHEREIN THE FIRST STRUCTURE FAÇADE PORTION MATCHES FIRST STRUCTURE FAÇADE DATA OF THE SET OF STRUCTURE FAÇADE DATA
908

CALCULATING, BASED AT LEAST IN PART ON THE FIRST STRUCTURE FACADE PORTION OF THE FIRST IMAGE OF THE ENVIRONMENT, A SECOND POSITION ESTIMATE OF THE DEVICE
910

*FIG. 9*

IMAGE BASED TRACKING IN AUGMENTED REALITY SYSTEMS

PRIORITY

This application is a continuation of and claims the benefit of priority of U.S. patent application Ser. No. 15/591,887, filed on May 10, 2017, which is a continuation of and claims the benefit of priority of U.S. patent application Ser. No. 14/954,090, filed Nov. 30, 2015, which claims the benefit of priority to U.S. Provisional Patent Application No. 62/248,706, filed Oct. 30, 2015, which are hereby incorporated by reference herein in their entirety.

BACKGROUND

Augmented reality refers to using computer generated enhancements to add new information into images in a real-time or near real-time fashion. For example, video images of a wall output on a display of a device may be enhanced with display details that are not present on the wall, but that are generated to appear as if they are on the wall by an augmented reality system. Such systems require a complex mix of image capture information that is integrated and matched with the augmented reality information that is to be added to a captured scene in a way that attempts to seamlessly present a final image from a perspective determined by the image capture device.

BRIEF DESCRIPTION OF THE DRAWINGS

Various ones of the appended drawings merely illustrate example embodiments of the present disclosure and should not be considered as limiting its scope.

FIGS. 5A-F illustrate aspects of an image based tracking in an augmented reality system, according to some example embodiments.

FIG. 9 is a method for image based tracking, according to some example embodiments.

DETAILED DESCRIPTION

Figure 1A:
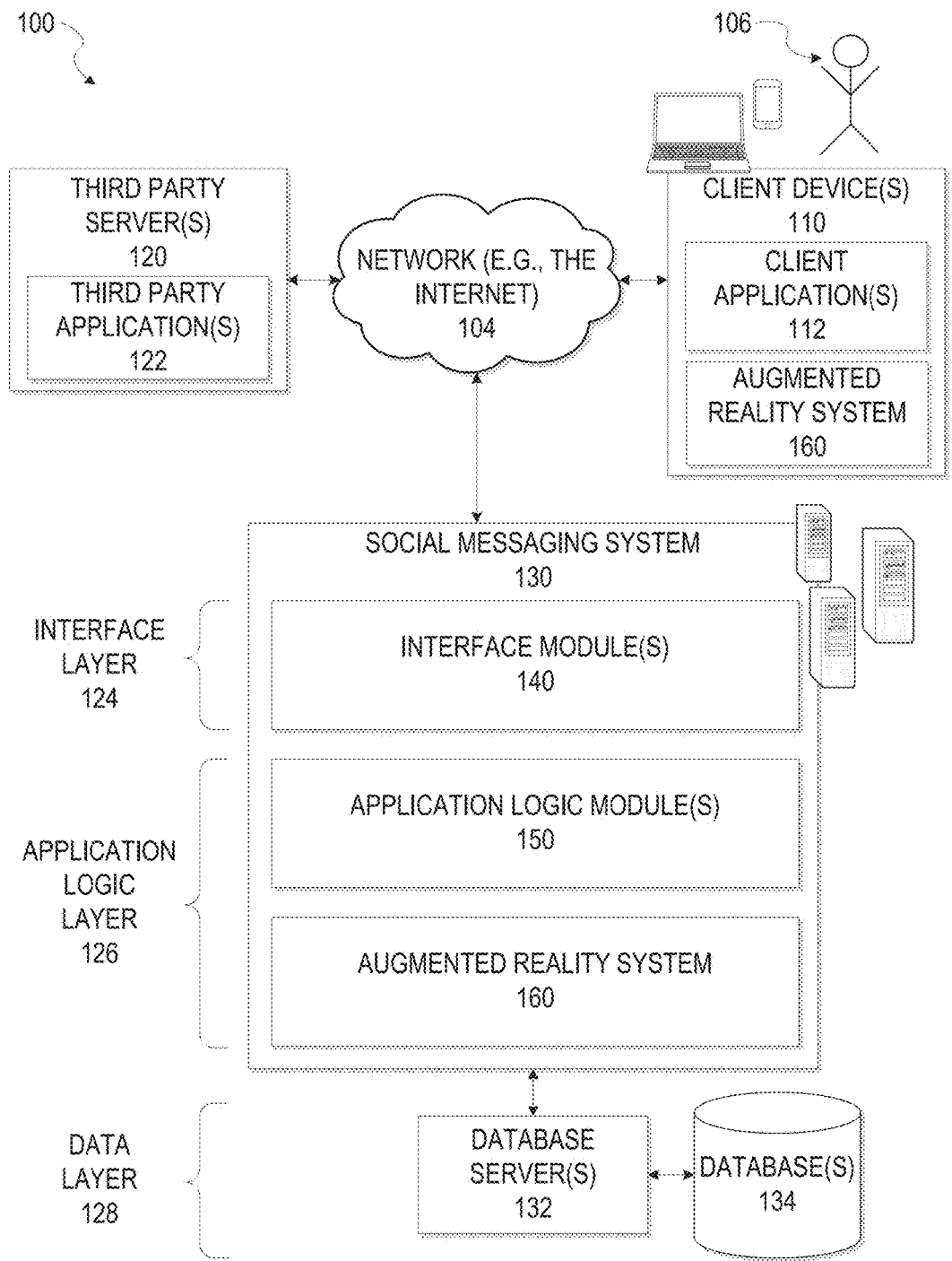
FIG. 1A is a block diagram illustrating a networked system, according to some example embodiments.

The following relates to augmented reality image processing and image based tracking. Some particular embodiments describe using an initial rough location estimate to identify façade data about local buildings. An image captured for an augmented reality system may then be compared with the façade data. This comparison attempts to match some or all of a building façade against a portion of the captured image. Location and perspective information from the façade data may be used along with an identified matching portion of the captured image to generate a second estimate of the location associated with the perspective of the captured image. This second, more accurate location may then be used to place virtual items within the captured image or subsequent related captured images as part of an augmented reality display.

The description that follows includes systems, devices, and methods that illustrate embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details.

Augmented reality, as described herein, refers to systems and devices that capture images, enhance those images with additional information, and then present the enhanced information on a display. This enables, for example, a user to hold up a phone to capture a video stream of a scene, and an output display of the phone to present the scene as visible to the user along with additional information. This information may include placing virtual objects in the scene so the virtual objects are presented as if they existed in the scene. Aspects of such virtual objects are processed to occlude the virtual object if another real or virtual object passes in front of the virtual object as shown from the perspective of the image sensor capturing the environment. Such virtual objects are also processed to maintain their relationship with real objects as both real and virtual objects move over time, and as the perspective of the image sensor capturing the environment changes.

One issue that arises with such augmented reality scenes including both real objects and virtual objects is setting and maintaining a tracking between the real objects and the virtual objects. This tracking is important to maintaining an immersive presentation of the virtual objects within the environment and treating the virtual objects as if they were real within the environment. Failed tracking creates jitter or unexpected movement of the virtual item within a scene, or may set an initial virtual object placement that overlaps or is out of synchronization with real objects in unnatural ways.

Simultaneous location and mapping (SLAM) systems are systems that are used to track key points in two dimensional image frames of video, and to identify three-dimensional objects from the image frames as well as a relative location of the camera to those objects. Such processing to identify three-dimensional objects, however, is processor and memory intensive.

A "façade" as used herein refers to details of a building or physical structure, including details of building walls. The real world environment of a building may include significant three-dimensional texture, but as used herein, a façade includes portions of a wall or building that may be modeled as two-dimensional. This particularly includes patterns such as murals or other images that may be part of a building's wall surfaces. Façade data for a building may include a simplified two-dimensional model of one or more exterior walls of a building. Such a model may include location points for such walls, as well as two-dimensional image data from such walls. When compared with complex three-dimensional point cloud models of objects, a two-dimensional façade model is much simpler. Processing an image to identify a match with a two-dimensional model of a wall also will generally consume fewer processing resources than processing one or more video images against a three-dimensional model of an object. Efficiencies in processor and memory systems are particularly important when working with mobile devices or wearable devices with significant limitations on resource availability.

Further still, by using global positioning systems or other location based systems to identify an initial rough location estimate, the processing resources needed to match two-dimensional façade data against a captured image may be further limited. Map databases may include image information and/or façade models for buildings in a particular location. Using such a database along with an initial rough location estimate may be used to limit the expected buildings in a captured image to a very small number, or may automatically be used to identify a single building. Starting with this information, some devices with limited processing resources can match the two-dimensional façade data against the captured image in a near real-time fashion. Some such devices may not be able to perform such near real-time calculations for three-dimensional matching. The perspective of a building that is represented in a captured image may then be used to create an accurate estimate of a position of the image sensor that was used to generate the captured image. Such an accurate position estimate may be used in a variety of ways, including use to properly place and track virtual objects within an environment as part of an augmented reality system.

FIG. 1A is a network diagram depicting a network system 100 having a client-server architecture configured for exchanging data over a network, according to one embodiment. Such a network system may be used to communicate information for virtual objects to be displayed on client devices 110, street view data used to create façade models, and the resulting façade models as they are used by augmented reality system 160. In some embodiments, the network system 100 may be a messaging system where clients communicate and exchange data within the network system 100. The data may pertain to various functions (e.g., sending and receiving text and media communication, determining geolocation, etc.) and aspects associated with the network system 100 and its users. Although illustrated herein as client-server architecture, other embodiments may include other network architectures, such as peer-to-peer or distributed network environments.

As shown in FIG. 1A, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each module or engine shown in FIG. 1A. represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1A. Additional functional modules and engines may be used with a social messaging system, such as that illustrated in FIG. 1A, to facilitate additional functionality that is not specifically described herein. Furthermore, the various functional modules and engines depicted in FIG. 1A may reside on a single server computer, or may be distributed across several server computers in various arrangements. Moreover, although the social messaging system 130 is depicted in FIG. 1A as a three-tiered architecture, the inventive subject matter is by no means limited to such an architecture.

As shown in FIG. 1A, the interface layer 124 consists of interface modules (e.g., a web server) 140, which receive requests from various client-computing devices and servers, such as client devices 110 executing client applications 112, and third party servers 120 executing third party applications 122. In response to received requests, the interface modules 140 communicate appropriate responses to requesting devices via a network 104. For example, the interface modules 140 can receive requests such as Hypertext Transfer Protocol (HTTP) requests or other web-based Application Programming Interface (API) requests.

The client devices 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). In an example, the client devices 110 are executing the client applications 112. The client applications 112 can provide functionality to present information to a user 106 and communicate via the network 104 to exchange information with the social messaging system 130. Each of the client devices 110 can comprise a computing device that includes at least a display and communication capabilities with the network 104 to access the social messaging system 130. The client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), automotive computing devices with driver heads up displays (HUD), smart phones, tablets, ultrabooks, netbooks, laptops, desktops, multi-processor systems, microprocessor-based or programmable consumer electronics, game consoles, set-top boxes, network personal computers (PCs), mini-computers, and the like. Users 106 can include a person, a machine, or other means of interacting with the client devices 110. In some embodiments, the users 106 interact with the social messaging system 130 via the client devices 110.

As shown in FIG. 1A, the data layer 128 has one or more database servers 132 that facilitate access to information storage repositories or databases 134. The databases 134 are storage devices that store data such as sets of images of external areas generated by client devices 110 and sent to social messaging system 130; sets of façade data generated from images including buildings; map data matching images and façade data to geolocations; and other such data. In one embodiment, a database stores images captured from a street and associates those images with map data. Some implementations of such an embodiment may use filters or image cropping to remove people from the images, such as an embodiment that only stores image data above a height that includes people. Databases 134 may also store data such as member profile data, social graph data (e.g., relationships between members of the social messaging system 130), and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic modules 150, which, in conjunction with the interface modules 140, generate various user interfaces with data retrieved from various data sources or data services in the data layer 128. Individual application logic modules 150 may be used to implement the functionality associated with various applications, services, and features of the social messaging system 130, including aspects of augmented reality system 160. For instance, a social messaging application can be implemented with one or more of the application logic modules 150. The social messaging application provides a messaging mechanism for users of the client devices 110 to send and receive messages that include text and media content such as pictures and video. The social messaging application may also include mechanisms for providing augmented reality displays and content that integrate pictures and video with virtual objects. The client devices 110 may provide augmented reality displays and may also enable users to access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Similarly, augmented reality content may be provided for a predefined duration. Other applications and services may be separately embodied in their own application logic modules 150.

As illustrated in FIG. 1A, the social messaging system 130 or the client applications 112 include augmented reality system 160 that provides functionality to generate augmented reality images. In some embodiments, the augmented reality system 160 can be implemented as a standalone system on a client device 110 and is not necessarily included in the social messaging system 130. In other embodiments, the client devices 110 include a portion of the augmented reality system 160 (e.g., a portion of the augmented reality system 160 may be included independently or in the client applications 112). In embodiments where the client devices 110 include a portion of the augmented reality system 160, the client devices 110 can work alone or in conjunction with the portion of the augmented reality system 160 included in a particular application server or included in the social messaging system 130.

Figure 1B:
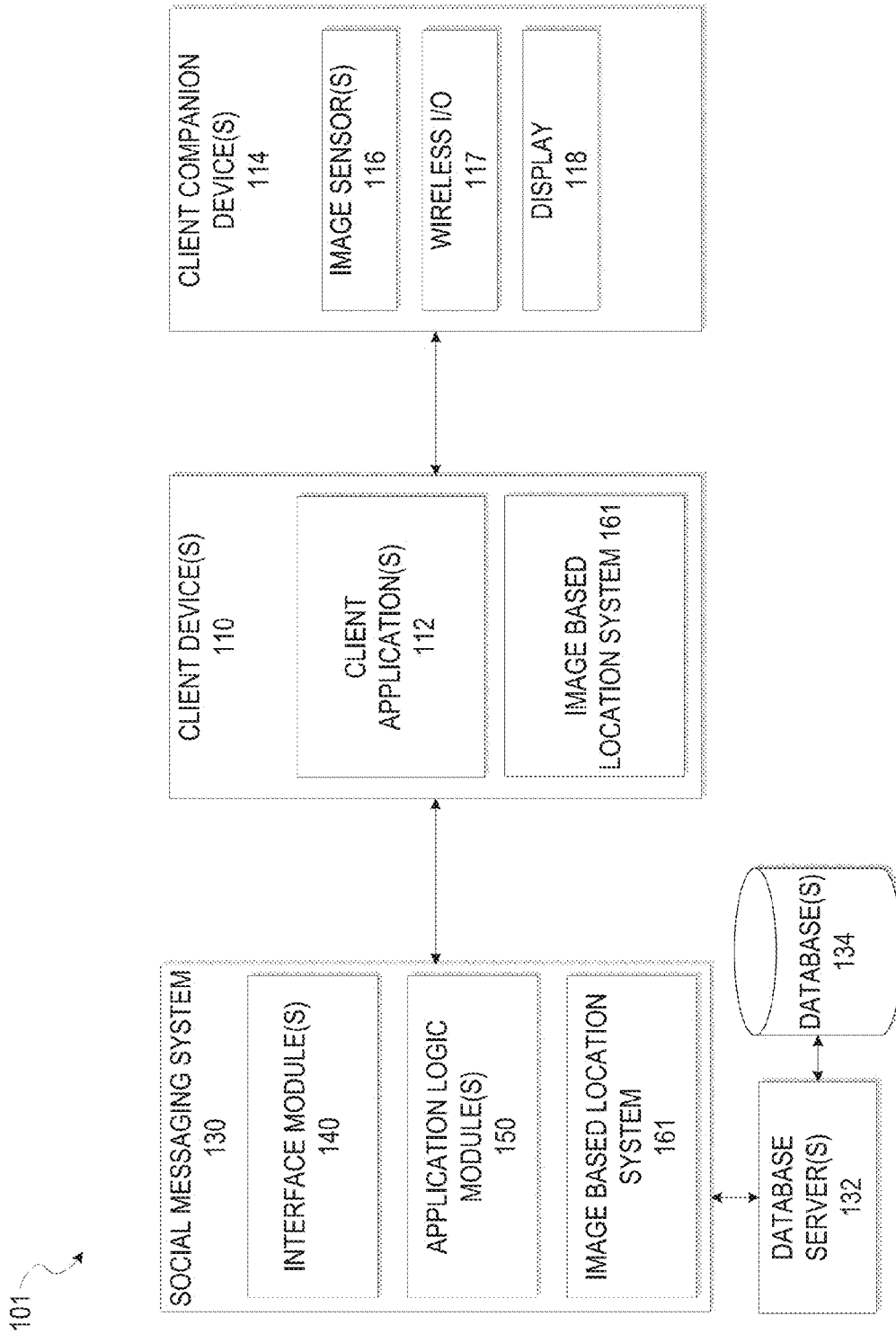
FIG. 1B is a block diagram illustrating a networked system including client and client companion (e.g. wearable) devices, according to some example embodiments.

FIG. 1B illustrates an alternative network system 101 that may be used with certain embodiments. Network system 101 includes social messaging system 130 with interface modules 140, application logic modules 150, database servers 132, and databases 134, as well as client devices 110 operating client applications 112, just as in network system 100. Network system 101, however, additionally includes client companion devices 114 connected to client devices 110. Client companion devices 114 may be wearable devices such as glasses, visors, watches, or other network enabled items. Client companion devices may also be any device described herein that accesses a network such as network 104 via another device such as client device 110. Client companion devices 114 include image sensors 116, wireless input and output (I/O) 117, and a display 118. Client companion devices 114 may include one or more processors, a battery, and a memory, but may have limited processing and memory resources. In such embodiments, client device 110 and/or server computing devices used for social messaging system 130 may be used via network connections to provide remote processing and memory resources for client companion devices 114. In one embodiment, for example, client companion device 114 may be a pair of network enabled glasses, such as the glasses of FIG. 11. Such glasses may not include any sensor based positioning system, so that methods described herein that perform an initial location estimate may estimate the position of a client device 110 that is wirelessly connected to the glasses. The glasses, however, gather images using image sensors 116 and use those images as a basis to generate and present augmented reality information to the user via display 118. The perspective of the images and any virtual objects added to images thus need to be tracked based on the position of the client companion device 114 glasses. In such an embodiment, the initial location may be based on the client device 110 location using global positioning system (GPS) or network enhanced location services. An image based location system 161 operating either on client devices 110, on social messaging system 130, or on both, may then use image data from image sensors 116 along with façade data identified by the initial location of the client device 110 to determine a location of the client companion device 114. In some embodiments, because the range of wireless I/O 117 systems is low, the system may assume that the location of client device 110 is within a sufficiently close distance of client companion device 114 that the façade data for buildings close to both devices will be the same.

Figure 2:
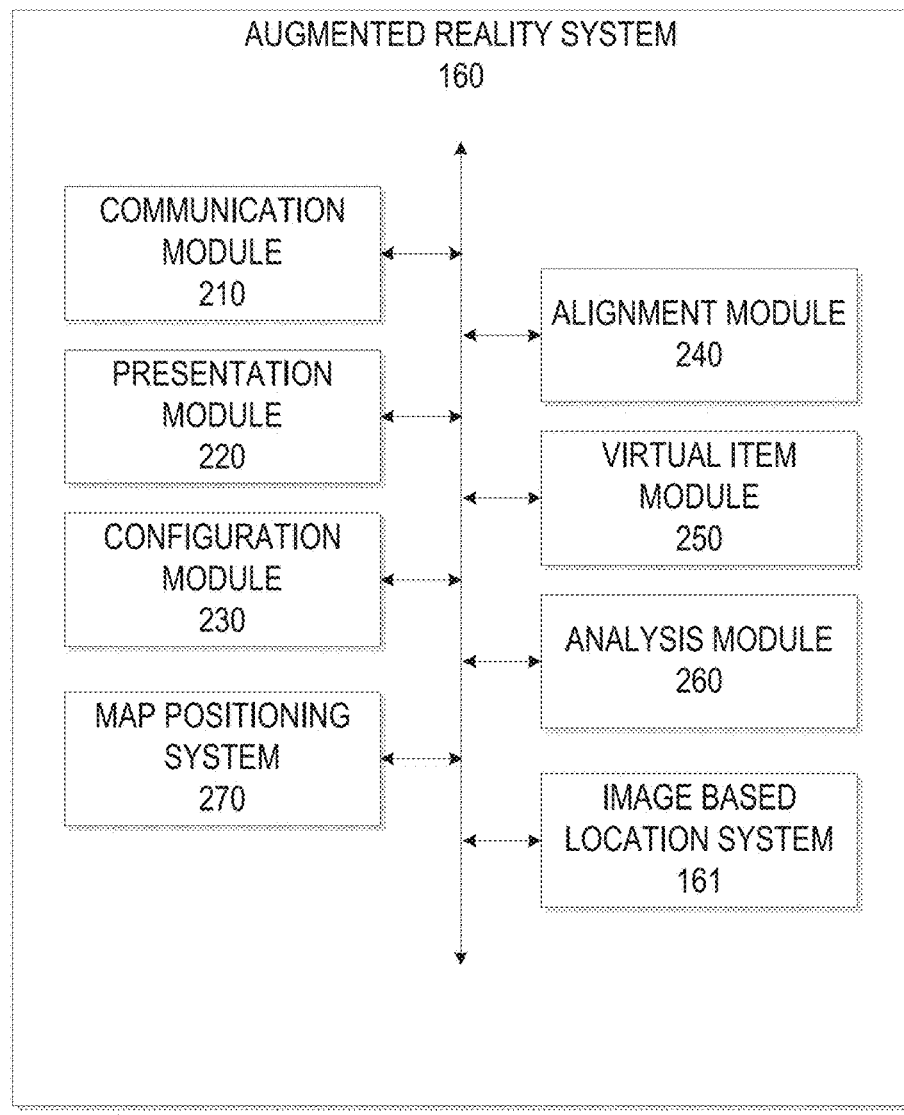
FIG. 2 is a block diagram illustrating an example embodiment of a augmented reality system, according to some example embodiments.

FIG. 2 is a block diagram 200 of one embodiment of an augmented reality system 160. The augmented reality system 160 is shown to include an image based location system 161, a communication module 210, a presentation module 220, a configuration module 230, an alignment module 240, a virtual item module 250, an analysis module 260, and a map positioning system 270. All, or some, of the modules 210-270 communicate with each other, for example, via a network coupling, shared memory, and the like. Each module of the modules of augmented reality system 160 can be implemented as a single module, combined into other modules, or further subdivided into multiple modules. Other modules not pertinent to example embodiments can also be included, but are not shown.

The communication module 210 provides various communication functionality. For example, the communication module 210 receives, accesses, or otherwise obtains image data of an image from a user device. In a specific example, the communication module 210 receives substantially real-time image data from a camera sensor of a smart phone (e.g., a single frame of image data or a continuous stream of frames captured by a camera sensor of the smart phone). The communication module 210 exchanges network communications with the database servers 132, the client devices 110, and the third party servers 120. The information retrieved by the communication module 210 includes data associated with the user (e.g., member profile data from an online account or social network service data) or other data to facilitate the functionality described herein.

The presentation module 220 provides various presentation and user interface functionality operable to interactively present and receive information to and from the user. For instance, the presentation module 220 is used to manage output of image data with aligned and inserted virtual objects, so that augmented reality images may be presented on a display. As mentioned above, these images may be presented in real-time or near real-time as the images are captured, processed to add virtual objects, and displayed with the virtual objects as quickly as possible. Presentation module 220 is also utilizable to present user interfaces, AR objects, or any such information generated in response to decoding an optical barcode such as optical barcode 806 discussed below. In various embodiments, the presentation module 220 presents or causes presentation of additional information (e.g., visually displaying information on a screen, acoustic output, haptic feedback). The process of interactively presenting information is intended to include the exchange of information between a particular device and the user. The user may provide input to interact with the user interface in many possible manners, such as alphanumeric, point based (e.g., cursor), tactile, or other input (e.g., touch screen, tactile sensor, light sensor, infrared sensor, biometric sensor, microphone, gyroscope, accelerometer, or other sensors). The presentation module 220 provides many other user interfaces to facilitate functionality described herein. The term "presenting" as used herein is intended to include communicating information or instructions to a particular device that is operable to perform presentation based on the communicated information or instructions. This may include both output on a screen as well as projection of an image onto a user's eye.

The configuration module 230 may be used to accept and manage user selection of system options. This may include options to select various augmented reality selections, including enabling augmented reality and requesting certain types of augmented reality information to be provided or triggered based on user inputs or input based triggers. For example, configuration module 230 may include a setting provided by a user to automatically present information about certain types of locations when the locations are identified in an image based location system or a map positioning system. Configuration module 230 may also accept user settings to automatically provide direction information in an augmented reality image when direction input triggers are received via communication module 210. In other embodiments, any other triggers for implementing image based location or augmented reality images may be managed by configuration module 230. For example, the configuration module 230 extracts and analyzes candidate shape features or candidate contour characteristics from image data of the image received from the user device (e.g., the client devices 110) when a system includes such analysis as a trigger for display of augmented reality images. The configuration module 230 determines satisfaction of various rules or criteria associated with the extracted candidate shape features. The configuration module 230 compares the extracted candidate shape features with reference shape features of the custom graphic or another reference image. The configuration module 230 can employ a wide variety of schemes and techniques to extract candidate shape features from the image data of the image and subsequently trigger display of augmented reality images.

The alignment module 240 provides image processing functionality to determine and verify an alignment of the image data captured by an image sensor and the virtual objects placed into the image. In some embodiments, alignment module 240 may access or generate a computer model of the environment, and may use the computer model to insert virtual items into an image based on the computer model of the environment. In some embodiments, alignment module 240 may perform threshold or rule checks to verify that virtual items displayed in augmented reality images meet certain quality metrics to provide an acceptable user experience. This may include verifying that a virtual object does not move in unexpected ways with respect to objects in an image, that images captured by an image sensor are sufficiently stable over time to enable augmented reality functions, or other such metrics. In some embodiments, the alignment module 240 extracts spatial attributes from the image data. In various embodiments, the spatial attributes include at least one of position, orientation, scale, or other spatial aspects of objects in images. The alignment module 240 determines an alignment of the image objects based on the spatial attributes (e.g., a particular orientation). In an example, the alignment module 240 can determine an alignment including position and orientation based on the spatial attributes and generate a transformed image according to the alignment.

The virtual item module 250 provides functionality to generate images associated with virtual items. In some embodiments, this may include graphics information related to virtual location markers, virtual direction arrows, or virtual items or objects. In some embodiments, this may include graphics information for inserting mobile virtual objects into video (e.g., virtual animals, robots, dinosaurs, video display, etc.). In some embodiments, for each virtual object, presentation rules may be stored in virtual item module 250 and used by other modules to verify that virtual objects may be inserted into image data with sufficient output quality.

The analysis module 260 provides functionality to perform a variety of image processing operations. Such operations may include image processing operations to identify key points in an image and to match two-dimensional façade data against portions of an image to identify a match. For example, in some embodiments, analysis module 260 may accept an image and identify building corners or other key points in the image that may contain two-dimensional pattern data as part of a façade. Analysis module 260 may then take façade data from a model and match the portion of the image to a building façade model included in the façade data. In some embodiments, if no match is found, an analysis module 260 operating on a client device 110 may request additional information or additional processing by an analysis module 260 operating on a remote server, such as a third party server 120 or a server that is part of a social messaging system 130.

The map positioning system 270 provides map data including associations between map locations and façade data associated with buildings in a location, or any other such information in a system. Map positioning system 270 may also interface with remote servers or systems, which may provide this information. Additional aspects of a map positioning system 270 are discussed below with respect to FIG. 6.

Image based location system 161 may comprise modules to accept street view images from any number of sources and analyze the images to generate façade data. Such façade data may include two-dimensional estimates of certain patterns on a building, as well as key point information for simple building locations, such as the locations of building corners or corners of two-dimensional façade patterns on a building. In some embodiments, information from multiple images may be used to generate façade data for a single building. Such information from multiple images may be used to match colors in different lighting situations, or to match minor changes over time to a building façade. In some embodiments, specialized image and location capture equipment may be used to generate information about building locations, keypoints of buildings, and building façade data with high accuracy in order to build a database of outdoor images of buildings in order to provide accurate references for image based location systems. Capturing locations of building corners, for example, with high accuracy (e.g., accuracy on the order of single digit centimeters or millimeters) provides a basis for an image based location estimate for a camera position with similar errors. In some embodiments, determining a camera position within a few centimeters (e.g., 5 cm) is sufficient to provide augmented reality presentation with a low chance of clear errors in the output images that break the reality illusion of augmented reality images.

In some embodiments, image based location system 161 may be distributed over a local client device and a remote server, with low information façade models (e.g., models with low-resolution and/or low color two-dimensional façade data and a small number of keypoints) stored locally on a device for regularly visited locations, expected future travel locations, or for buildings which the system believes might be near a device in the future. High information models (e.g., high resolution, high color information, and/or high numbers of three-dimensional keypoints) may be stored remotely and used when local compact façade models fail. Image based location system 161 may manage application of façade data and models to match portions of captured images using analysis module 260. Once a match is found using analysis module 260, location information related to a building matching façade data or keypoints in a building may be used to calculate a relative position of the camera perspective in a captured image. This relative position may be used to determine an absolute position based on the position of building keypoints or other absolute position information that is part of a façade or other model for a building associated with façade data.

Figure 3:
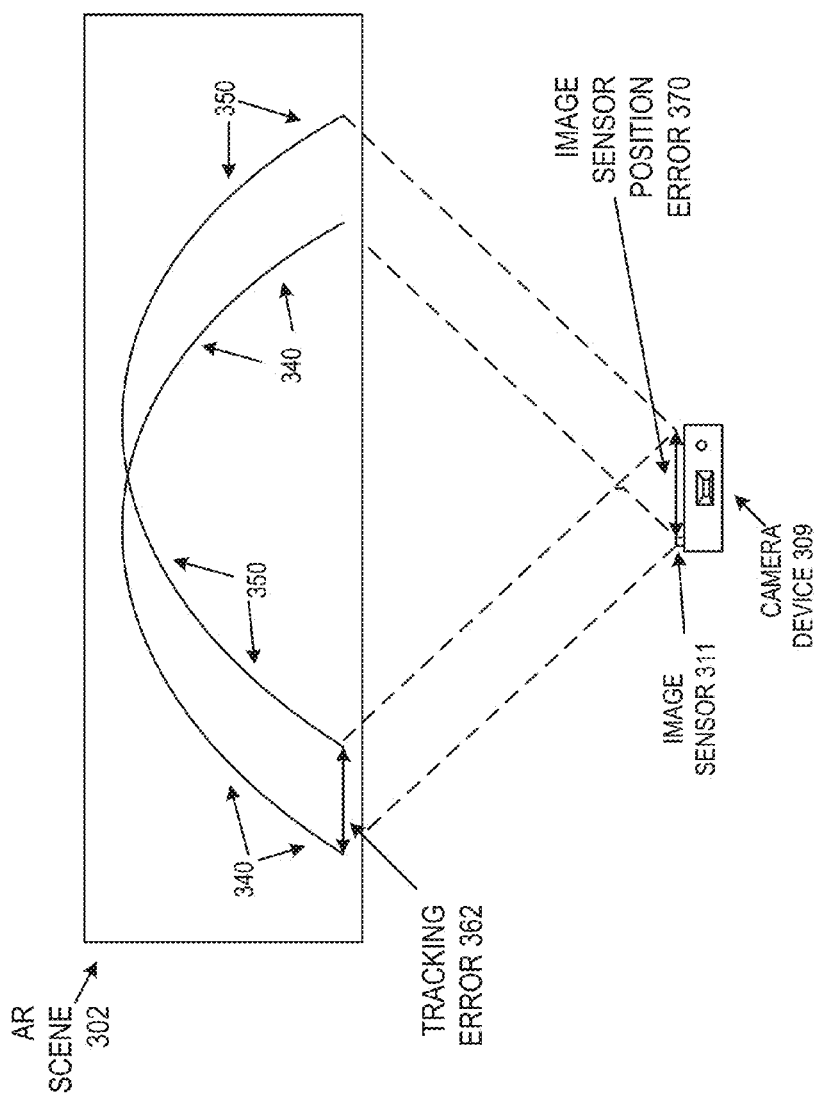
FIG. 3 illustrates aspects of an augmented reality system, according to some embodiments.
Figure 4A:
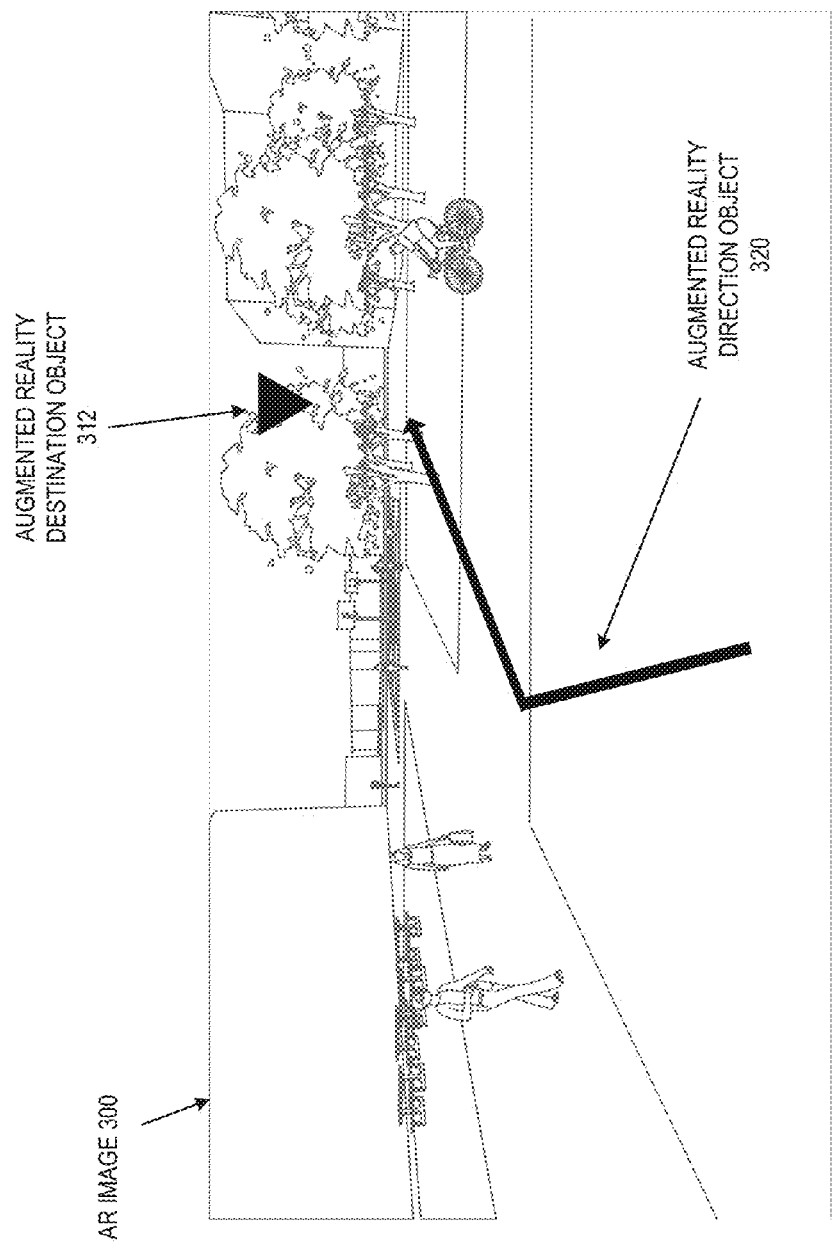
FIGS. 4A, 4B, and 4C illustrate aspects of an augmented reality system, according to some embodiments.

FIG. 3 illustrates aspects of an augmented reality system, including tracking and image sensor position errors that may generate problems with augmented reality images. As discussed above, an augmented reality system incorporates virtual objects into a scene captured by an image sensor. In order to correctly position and modify virtual objects within an augmented reality image, information about an image sensor position, real objects in a scene, and the virtual object position all need to be known. FIG. 3 shows an AR (augmented reality) scene 302 including real object data 340 captured by image sensor 311 of camera device 310. Real object data 340 includes information about physical objects in space distributed over a scene. In order to generate AR scene 302, the scene generated from real object data 340 is modified to add virtual object data 350. Virtual object data 350, however, is shown as misaligned with real object data 340 by tracking error 362. Such a tracking error 362 may result in improper and unnatural overlay of virtual objects on top of or behind real objects as presented in AR scene 302. An example of such an overlay error is illustrated by FIG. 4A. Tracking error 362 may have multiple causes or contributing factors, but image sensor position error 370, where an error in the understood position of image sensor 311 propagates to the placement of virtual object data 350 in AR scene 302, is one contributing factor to tracking error 362.

FIG. 4A shows an AR image 300 including real object data of buildings, trees, people, and pathways. An augmented reality system used to add augmented reality destination object 312 and augmented reality direction object 320 may use a map model of an environment to determine a location for augmented reality objects, and may then use an estimated camera position to place the augmented reality direction objects 310, 320 in AR image 300. An error in position estimation of a sensor that provides the perspective in AR image 300 may result in misplacement of objects 310 and 320. As shown, augmented reality direction object 320 shows a direction path through solid objects, and a destination object that is floating in an unexpected foreground placement. Such errors may, in some embodiments, be due to a large error in an estimated position of the image sensor which is used to determine placement of objects 310 and 320.

Figure 4B:
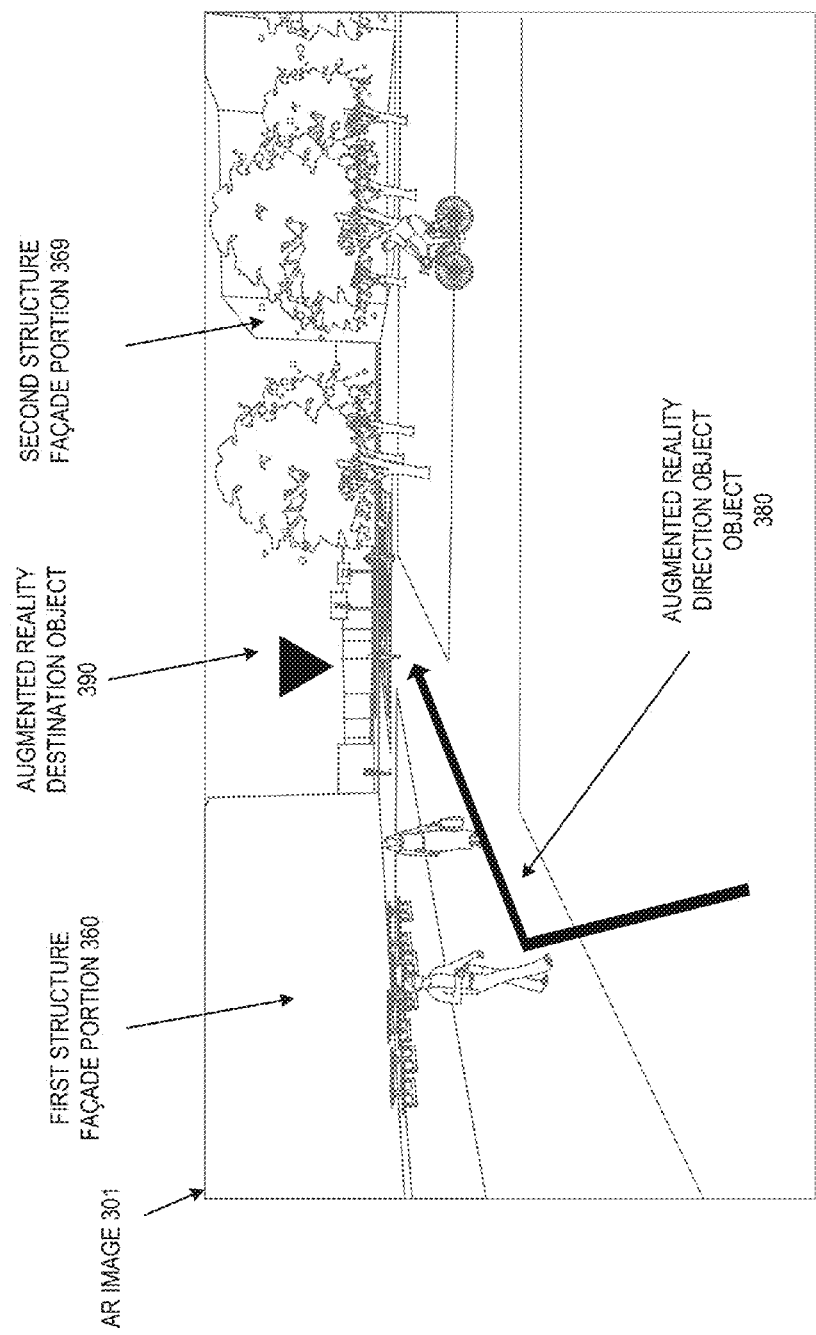

FIG. 4B then shows augmented reality direction object 380 and augmented reality destination objects in an expected and correct placement within AR image 301 with a small or no tracking error. As described herein, a first structure façade portion 360 and/or a second structure façade portion 370 of the original image used for AR image 301 may be identified and matched to façade data. Façade data for first structure façade portion 360 may initially be used to identify first structure façade portion 360 within the original image. The rotation, size, and placement of the first structure façade portion 360 within the image and compared with façade data for the matching building may be used to generate a high accuracy position estimate for the image sensor. This may reduce or eliminate an image sensor position error, and improve tracking for AR image 301.

Figure 4C:
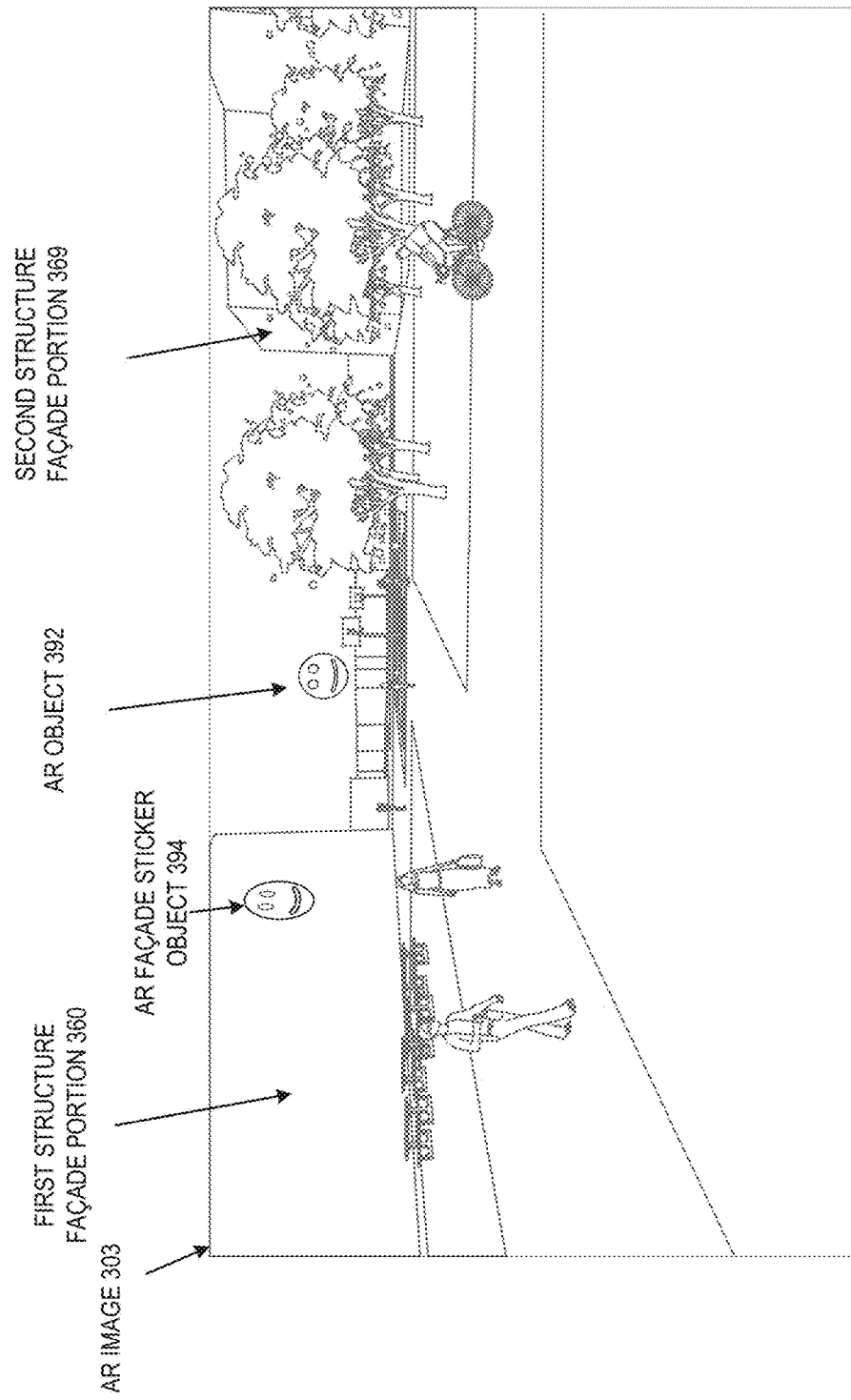

Further still, in some embodiments, the calculations performed to match façade data from a database to a portion of an image may also be used to generate two dimensional augmented reality objects that match the façade surface. FIG. 4C illustrates an example using two-dimensional augmented reality data for augmented reality "sticker" objects. In a simplest example, augmented reality destination object 390 may simply be a two-dimensional triangle associated with a three-dimensional set of geolocation coordinates. Regardless of which angle such a two-dimensional sticker object is viewed from, it will always be seen as the same shape in an augmented reality image. Similarly, an emoji sticker object may be used in certain embodiments. In such embodiments, a user may access a simple interface to graphically select an emoji and place the emoji in an image, so that the augmented reality system associates the emoji sticker object with another object in the image or with a set location. AR object 392, for example, is a two-dimensional emoji sticker object attached to a destination location. AR object 392 will float above the destination location within the AR image 301 and any related AR images. If an AR object 392 is attached to an object that moves, such as a book, or a space above a person, the AR object 392 may retain a relative position with respect to the attached object or a relative position that is a set space above the attached object.

In some such embodiments, an AR sticker object may be attached to a building with associated façade data in an augmented reality system. AR façade sticker object 394 is an emoji graphic used as an augmented reality object in image 301. As a perspective of an augmented reality view changes, the perspective of AR façade sticker object 394 changes to maintain the appearance that AR façade sticker object 394 is attached to the building wall. In order to eliminate redundant calculations, the perspective data about first structure façade portion 360 may be used to calculate the perspective required for AR façade sticker object 394, since they are in the same plane of the augmented reality space.

In other embodiments, AR objects such as AR object 392 may be 3D objects, such that an AR object like AR object 392 could be a sphere with a face on one side. Another such AR object could be any such 3D version of an emoji, face, animal, or other object. In one embodiment, an AR object could be a 3D tree covered with colored lights in a varying pattern. Any such AR object may also include animations. For example, the lights on the tree could sparkle and blink in different patterns. Such an AR object could further be placed or move, such that the tree with blinking lights could spin while moving through the air. In some embodiments, the system is able to generate and place an associated "sticker" version of such a 3D AR object. This may be done with a 2D projection of the 3D object at a user viewing elevation or a system standard (e.g. 0, 15 degree, etcetera) elevation. Such a generated 2D sticker object can then be placed on a wall or façade using the calculations previously performed by the system as described within the context of various other embodiments herein. If multiple 2D sticker objects are generated from different viewing angles, the stickers may have different patterns due to the different viewpoints. The 2D sticker versions may have fixed coloring, or may maintain some of the animations of the 3D object. For example, the lights on a 2D tree may sparkle and blink similar to those in the corresponding 3D AR object. Thus, as described herein, AR objects may include a variety of faces, emoji, animals, custom user made objects, or any other such possible AR objects. Such AR objects may have associated animations, sounds, transformations, and any other such AR object functionality.

Some embodiments described herein can then use communication data or a set of pictogram data stored at the device to generate augmented reality images with these sticker objects. One embodiment involves receiving or accessing at the device, two-dimensional augmented reality data for a sticker object, determining an augmented realty placement of the sticker object as positioned on a plane with the one or more façade surface locations, using the expected perspective for the low-resolution two-dimensional façade pattern as a sticker object perspective, and generating an augmented reality image comprising the sticker object on the plane with the one or more façade surface locations based on the expected perspective.

The two-dimensional augmented reality data can, in some embodiments, represent an emoji object selected by a user input from a set of augmented reality system pictograms. A user interface within a messaging or augmented reality system may display a set of pictograms or emoji images on an interface similar to the interface of FIG. 10B, and then enable a user to associate a location with the selection to generate an augmented reality object within an environment in order to generate augmented reality images such as augmented reality image 303.

FIGS. 5A-F illustrate, in a simplified form, how a façade image portion of an image captured by a sensor may be used to estimate a position of the image sensor. As illustrated, the size and shape of a building side will change based on a position of the sensor capturing the image. If an absolute size and shape of a façade 501 for building 500 is known, then given a façade image portion representing façade 501, a sensor position can be calculated. As described above, such size and shape data, along with two-dimensional pattern information for images or characteristics of a building, may be captured and stored in a database, both as images and as modeled façade data. Using this façade data to match two-dimensional patterns and to provide information about the size and shape of façade 501, given a façade image portion 502, position 504 can be identified as the location of the sensor that would provide façade image portion 502. Transform calculations can also be used to determine, for example, that façade image portion 512 would result from façade 501 being captured from position 514, and façade image portion 522 would result from an image being captured from position 524. Thus, as described above, given façade information for a building and a captured image from a device sensor including the façade, calculations may be performed to identify the position of the sensor relative to the façade.

Figure 6:
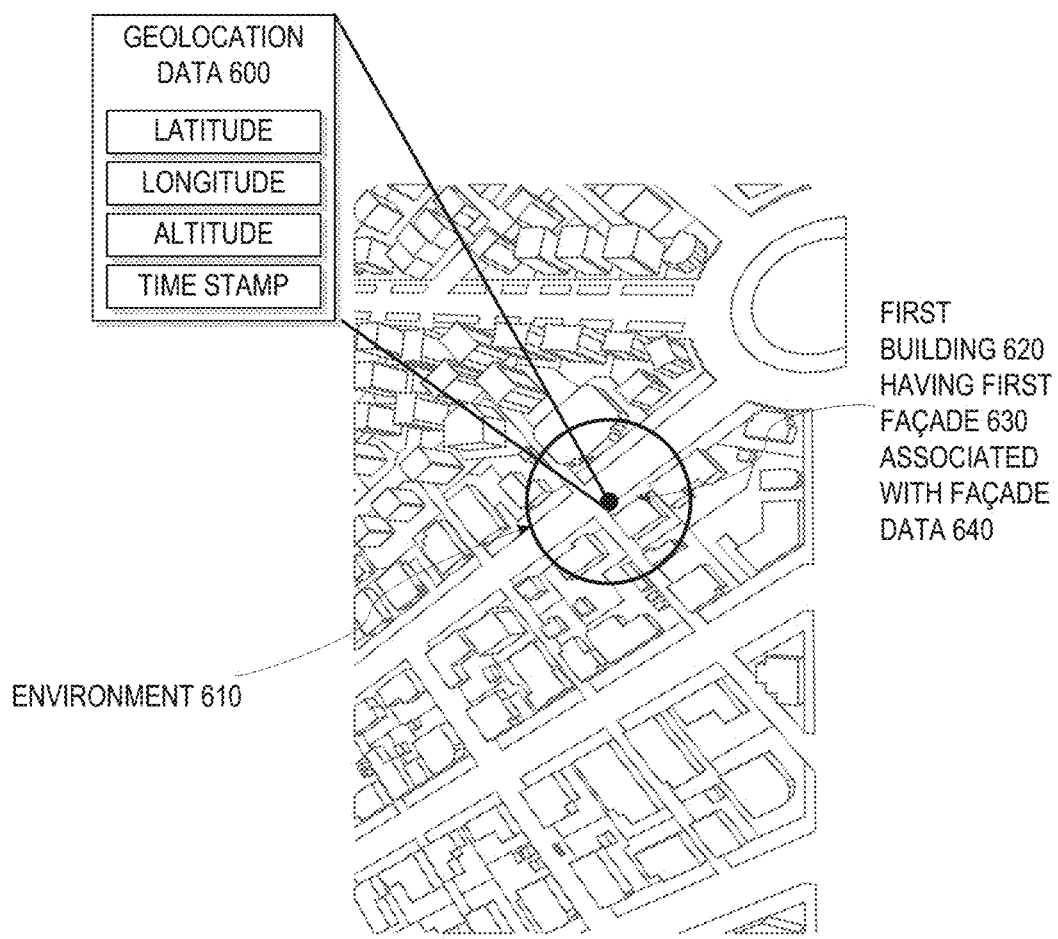
FIG. 6 illustrates aspects of a tracking system for use with an augmented reality system, according to some example embodiments.

Even with the limitations of two-dimensional façade matching, comparing façade data for many buildings against multiple facades within an image is a processor intensive process. Thus, as described above, an initial location estimate may limit the number of matching procedures needed. A GPS, network assisted location system, or other device sensors and systems for location determination may thus be used to provide an initial location estimate. Such estimates may have errors of a few meters or tens of meters. FIG. 6 illustrates aspects of a mapping system used to generate an initial location estimate, and to identify façade data for buildings in an area. Geolocation data 600 derived from such information may be used, however, to identify an environment expected to be captured by an image sensor. The larger the error, the larger the number of buildings identified in the environment and possible façade data to be matched against a captured image. In some embodiments, position data may also be used to limit the possible buildings based on a direction associated with an image sensor. As shown by FIG. 6, an environment 610 may include a first building 620. A database or image based location system may determine the possible buildings within environment 610 including first building 620, and may have associated façade data 640 for a wall/first façade 630 of first building 620. This façade data 640 may then be compared with an image associated with geolocation data 600.

Figure 7:
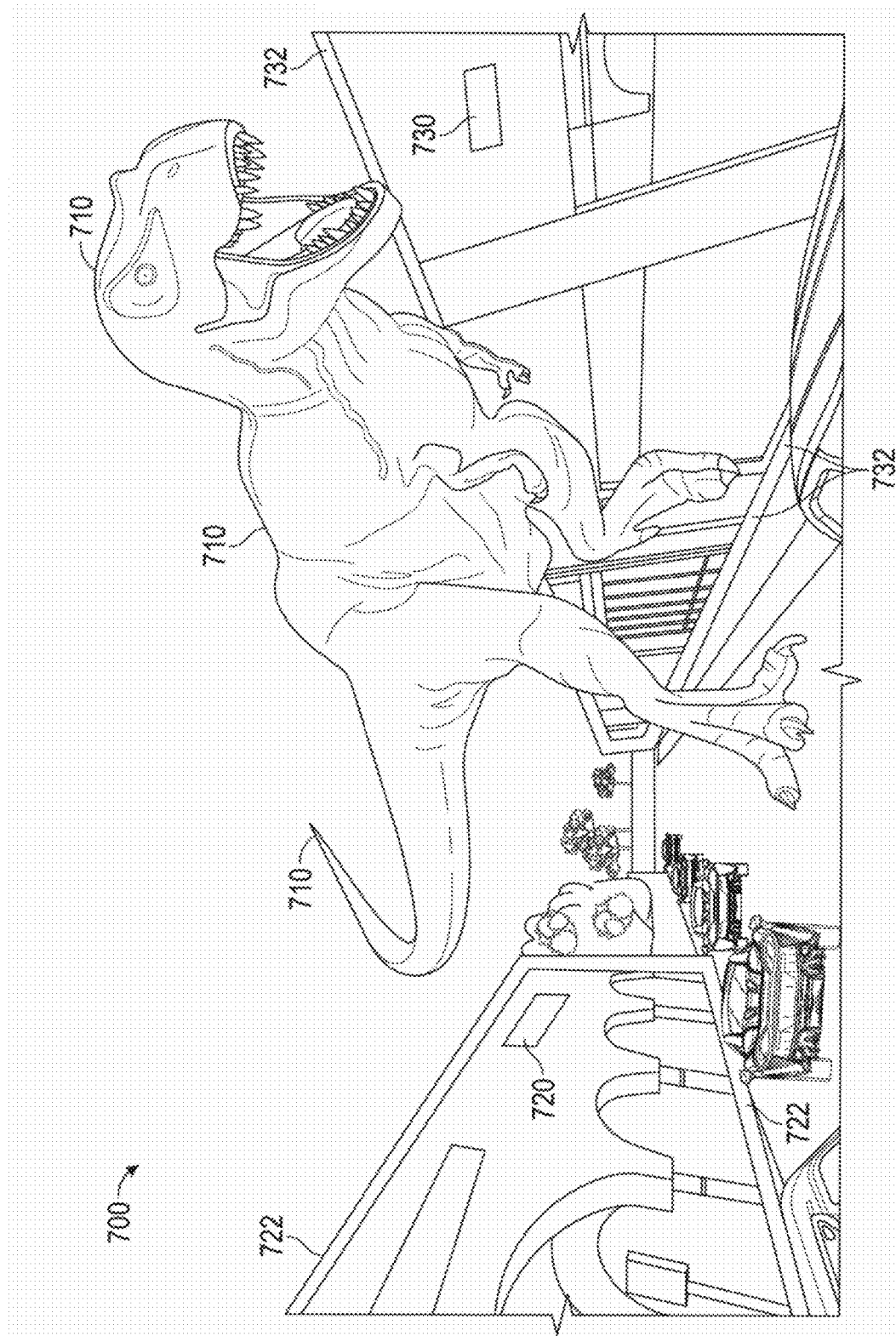
FIG. 7 illustrates aspects of an augmented reality system, according to some embodiments.

FIG. 7 then illustrates an AR image 700 that may be part of an AR video or AR event. In an AR event, virtual objects such as virtual object 710 may move within a virtual environment matched to the real environment, so that as a camera perspective changes, virtual object 710 is not static, but moves over time whether or not virtual object 710 is within the perspective area captured by a sensor. AR image 700 may be generated using image based tracking to locate and set a correct image sensor location and pose within the AR and matching real world environment. This tracking may be performed with the capture of image data and a match of first structure façade portion 720 of the image data to façade data 722, with the position of the sensor determined based on this match. In some embodiments, multiple buildings may be matched, such that second structure façade portion 730 may be matched to façade data 732, and both matches used to determine the camera position. As referred to herein, the camera and/or sensor position refers to all aspects of a sensor position that impact a generated image, including height, longitude, latitude, elevation, azimuth, rotation, or any other such element in any coordinate and perspective description system. This estimated camera position may then be used to correctly image virtual object as part of AR image 700, and avoid errors with virtual object 710 running through buildings or cars as if they were not there rather than running down the open street.

Figure 8:
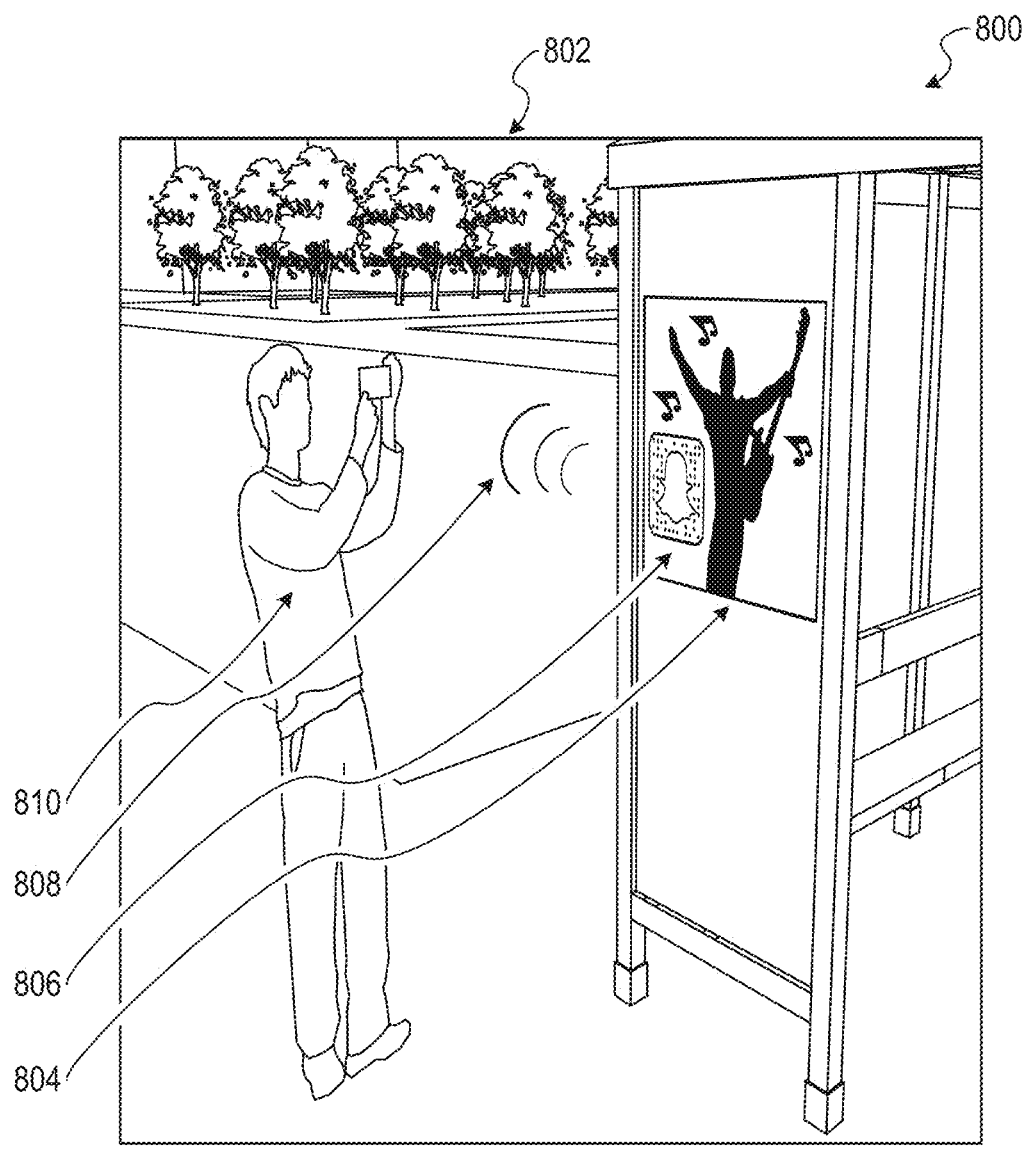
FIG. 8 illustrates aspects of an augmented reality system, according to some embodiments.

As illustrated by FIG. 8, any façade information for a two-dimensional surface in a known location may be used in various embodiments described herein. In some embodiments, murals or wall paintings may be used as façade data, while in other embodiments, posters or advertisements in known positions may be used. In some embodiments, codes, logos, signs, or other two-dimensional objects or objects that can be reliably estimated as two-dimensional for matching purposes, may be used. This includes structures other than buildings, including billboards, sides of opens structures, or any other façade placement that is expected to be stationary over at least a set amount of time.

In FIG. 8, for example, a custom graphic in an image portion provides alignment information that may be further matched with façade data about the custom graphic. Façade data may also include position and elevation information about the custom graphic that may be used in matching and in determining an image sensor position based on the size and shape of the graphic and other elements of a façade in a portion of a captured image. Such a graphic may also be used in placement of two-dimensional objects such as emoji stickers within a virtual environment.

In the diagram 800, a scene 802 illustrates a facade 804 that includes an optical barcode 806, and a user 810. It will be appreciated that the optical barcode 806 can be displayed in a variety of manners such as on a user device display, a computer display, woven or otherwise affixed to an article of clothing or another product, or included in a variety of printed items.

In an example embodiment, the user device 814 captures an image of the poster 804 that includes the optical barcode 806. The augmented reality system 160 receives the image data representing the image from the user device 814. In this example embodiment, the augmented reality system 160 is included in the user device 814 (e.g., an application executing on a smart phone of the user 810), although in other example embodiments, the augmented reality system 160 can reside on a server (e.g., a server of the social messaging system 130) that is communicatively coupled with the user device 814. The captured image may then be compared with façade data about poster 804 to identify a position of an image sensor. This image sensor position may then be used to provide accurate placement of virtual objects in an AR scene.

FIG. 9 is a flow diagram illustrating an example method 900 for image based tracking and position estimation for an image sensor. In some embodiments, the operations of the method 900 can be performed by components of the augmented reality system 160 as described above.

Operation 902 involves determining, using a first positioning system, a first position estimate for the device. Such a position system may include any combination of a GPS, a network assisted location system such as a secure user plane location (SUPL) system, position systems based on sensors of a device such as accelerometer or gyroscope tracking systems, or any other such initial tracking method.

Then, based on the first position estimate, operation 904 involves accessing a set of structure facade data describing one or more structure facades associated with the first position estimate. As described above, in some embodiments, a database of street images and façade data may be generated using specialized equipment. In other embodiments, large amounts of user data may be used to gather images and many data points regarding façade data and building key points. The façade data may include different types and combinations of data. In some embodiments, façade data includes absolute location information for one or more points on the façade that are clearly identifiable. Such points include building corners or clearly defined patterns or image corners. Façade data may additionally include two-dimensional image patterns that are part of a building façade, such as data versions of artwork, signage, logos, words, windows, arches, doorways, or other sufficiently two-dimensional portions of a building side.

In some embodiments, images captured for use with augmented reality systems may be provided as feedback to generate and update façade data while a user is using the system. In order to provide privacy in such situations, in some embodiments, the image data captured by users may be processed to eliminate or blur users, or may have all data below user height level removed with only building or façade portions of images transferred to a server system for use in generating or updating façade data using map, building, or environment models.

Operation 906 then involves capturing, by an image sensor of the device, a first image of an environment. Such an image sensor may be any camera device sensor or light sensor capable of capturing two-dimensional information of a building and an environment. In some embodiments, additional sensors may be present including multiple image sensors or sensors for capturing three-dimensional data. Such embodiments may supplement the two-dimensional analysis of façade data matched to façade portions of images as allowed by system resource limitations such as battery and processing power limitations.

Then, at operation 908, using the set of structure facade data, a first structure facade portion of the first image of the environment is identified, wherein the first structure façade portion matches first structure façade data of the set of structure façade data. Operation 910 then involves calculating, based at least in part on the first structure facade portion of the first image of the environment, a second position estimate of the device.

In various embodiments, the image data from the user device is received in response to a user-initiated image capture, a periodic monitoring of image data being detected by the optical sensor of the user device, or a combination thereof. In some embodiments, the image data represents an image or video being captured by the user device in substantially real-time (e.g., a live image feed from a camera sensor of a smart phone). In some embodiments, elements of captured images may be used to initiate generation of AR images, and an output of video enhanced with AR elements, which also attempts to output the AR images as video in substantially real-time. In embodiments where the image data comprises video image data, the augmented reality system 160 can analyze individual frames of the video or a combination of multiple frames of the video to detect and decode trigger elements or matched façade portions of images.

The matching portion of method 900 may use various techniques for matching façade data with an image. In some embodiments, combinations of edge detection in images may be compared against edges identified in façade data. In other embodiments, candidate shapes for each building façade may be present in façade data and compared against image data. Some embodiments identify shape features such as contour lines or localized concentrations of color or shading of the image. In some embodiments, a matching system extracts multiple candidate shape features from the image data. In some embodiments, the candidate shape feature includes various shape feature data such as a position of the candidate shape feature relative to a boundary of the image, a brightness of the candidate shape feature relative to the image, an average color of the candidate shape feature, and so forth. Limitation of the match to two-dimensional façade data as described above increases match performance while limiting resource usage as described above when compared to three-dimensional match processes.

In further example embodiments, façade data stored locally on a mobile device includes a low-resolution copy of the image. A matching resolution version of the captured image is created. Various image processing may be performed, such as a blur (e.g., a Gaussian blur function or another blur function) and a thresholding, to generate a modified low-resolution image. The thresholding image process can include adjusting lighter colors (e.g., as determined by a threshold or threshold range) of the low-resolution copy of the image to a white color and darker colors (e.g., as determined by a threshold or threshold range) of the low-resolution copy of the image to a black color. Façade data may then be compared against a standardized image. In other embodiments, façade data may include matching data customized for environmental factors present at the time an image is taken, such as sun position, cloud impact on an image, or other environmental factors.

In some embodiments, matching as described in operation 908 may be performed through determining that a candidate portion of an image satisfies one or more shape feature criteria or rules associated with façade data.

In some embodiments, the matching system can perform an image transform using the spatial attributes (e.g., a de-skew, a rotation, a scale, or another type of image transform) to improve detectability or readability of data encoded in a portion of the image. The particular image transforms used to identify a match may further be used as part of the calculation of the second position estimate of the device in operation 910. In some embodiments, an initial set of match calculations are performed in an operation 908, and once a threshold match is completed, subsequent calculations are performed to further limit error in the second position estimate by using additional refinements of image transforms including finer transform adjustments and match verification.

As described above with respect to FIGS. 1A and 1B, in some embodiments, an initial match and/or position estimation using façade data stored locally on a mobile device may fail. This may be due to lighting, unusual obstructions such as vehicles or tree growth blocking portions of a façade in an image, or any other such image match failure, particularly when low-resolution and resource constrained matching operations are used at a mobile device.

Such an embodiment may involve calculating, from the first position estimate and the one or more façade surface locations, an expected perspective for the low-resolution two-dimensional façade pattern and processing the low-resolution two-dimensional façade pattern to generate a first perspective pattern. A determination may then be made at the mobile device that the first perspective pattern does not meet a threshold match level for the first image. A supplemental set of façade data may then be requested from a first server computer. This may be a third party resource requested to provide additional detailed information or analysis, or may be a server of a system operating a portion of an augmented reality or image based matching system as described in FIGS. 1A, 1B, and 2. A supplemental set of façade data from the first server computer and used in identifying the first structure façade portion of the first image of the environment, where the first structure façade portion as matching the first structure façade portion with the first structure façade data of the set of structure façade data is based on the supplemental set of façade data. In some such embodiments, requesting the supplemental set of façade data from the first server computer involves communicating the first image of the environment to the first server computer and receiving a supplemental position estimate from the first server computer based on the first image.

In some embodiments, particularly embodiments using remote resources via a network, a delay may occur between matching of the image to façade data and a current time or a most recently captured image for a near real-time augmented reality video or display. In such embodiments, a system may track relative changes in movement of a device over time, and may use the image based location to improve later sensor position estimates. This may be done by keeping a record of video frames and images or other sensor data and calculating forward a position from the image based estimate using any available data. In some embodiments, an initial resource intensive matching may be performed remotely, with subsequent matching and sensor location estimates performed locally using lower resource matching and estimation processes. In some such embodiments, errors may be tracked, and remote resources used periodically to update position estimates and reduce errors that may grow over time in calculations on a local mobile device.

Any above method may be repeated over time to further improve a position estimate, with any number of subsequent estimates based on both a first image and subsequent images matched against façade data.

Further, as described above, in some such embodiments, images may be captured by a first device, such as a wearable device, and local estimates performed on a paired device such as a smartphone. Such systems may also use remote server resources as described above.

Figure 10A:
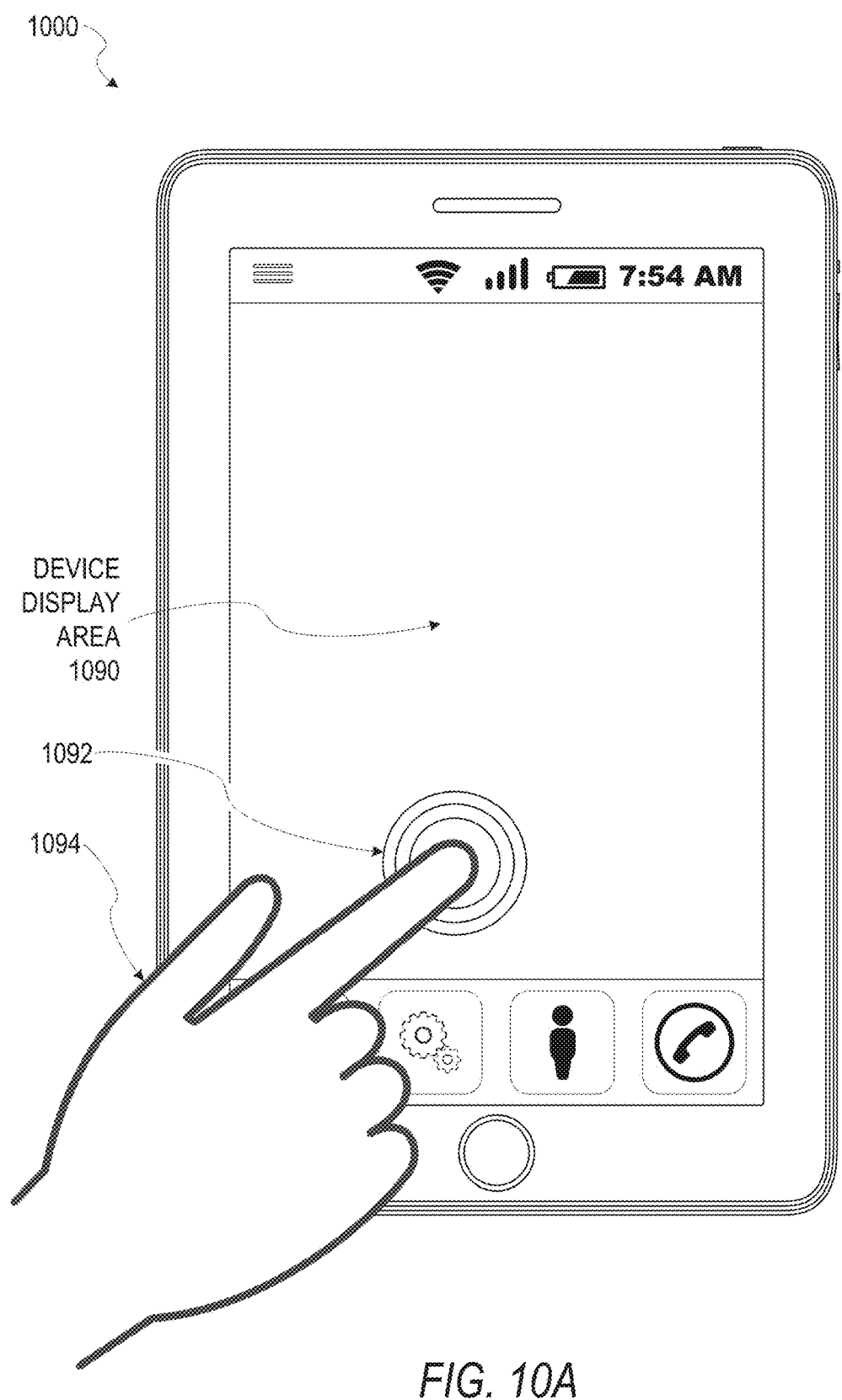
FIG. 10A illustrates aspects of a device that may be used for an augmented reality system, according to some example embodiments.

FIG. 10A illustrates an example mobile device 1000 that may be used for an augmented reality system. In such an embodiment, a device display area 1090 may present augmented reality images as described herein. Inputs and adjustments to any system operation described herein may be performed using touch screen inputs 1092 within device display area 1090 by a user 1094.

Figure 10B:
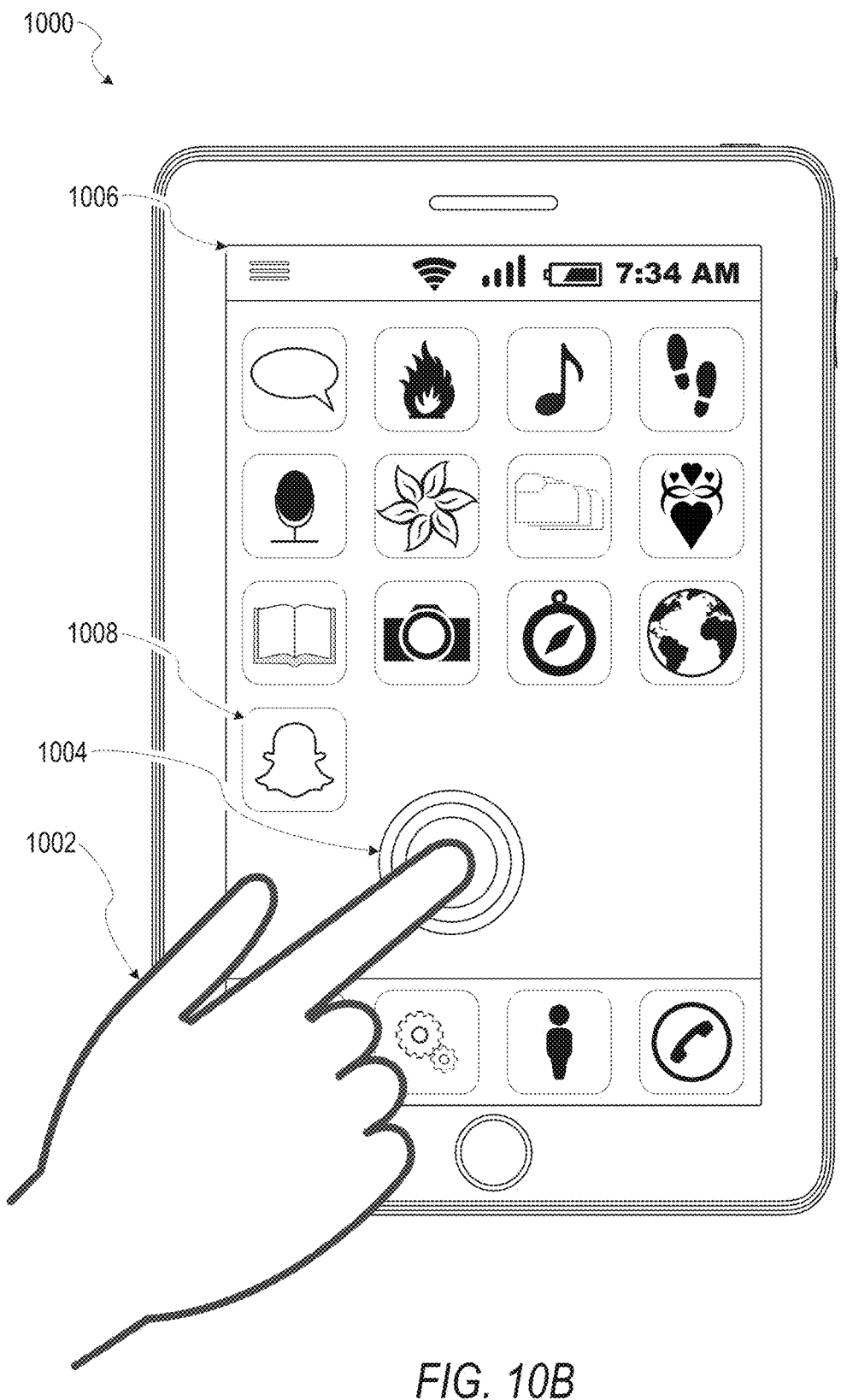
FIG. 10B illustrates a user interface diagram depicting an example mobile device and mobile operating system interface, according to some example embodiments.

FIG. 10B illustrates an example mobile device 1000 executing a mobile operating system (e.g., IOS™, ANDROID™, WINDOWS® Phone, or other mobile operating systems), consistent with some embodiments. In one embodiment, the mobile device 1000 includes a touch screen operable to receive tactile data from a user 1002. For instance, the user 1002 may physically touch 1004 the mobile device 1000, and in response to the touch 1004, the mobile device 1000 may determine tactile data such as touch location, touch force, or gesture motion. In various example embodiments, the mobile device 1000 displays a home screen 1006 (e.g., Springboard on IOS™) operable to launch applications or otherwise manage various aspects of the mobile device 1000. In some example embodiments, the home screen 1006 provides status information such as battery life, connectivity, or other hardware statuses. The user 1002 can activate user interface elements by touching an area occupied by a respective user interface element. In this manner, the user 1002 interacts with the applications of the mobile device 1000. For example, touching the area occupied by a particular icon included in the home screen 1006 causes launching of an application corresponding to the particular icon.

Many varieties of applications (also referred to as "apps") can be executed on the mobile device 1000, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1000 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1000 includes a social messaging app 1008 such as SNAPCHAT® that, consistent with some embodiments, allows users to exchange ephemeral messages that include media content. In this example, the social messaging app 1008 can incorporate aspects of embodiments described herein.

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

The modules, methods, applications and so forth described in conjunction with the figures above are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Figure 11:
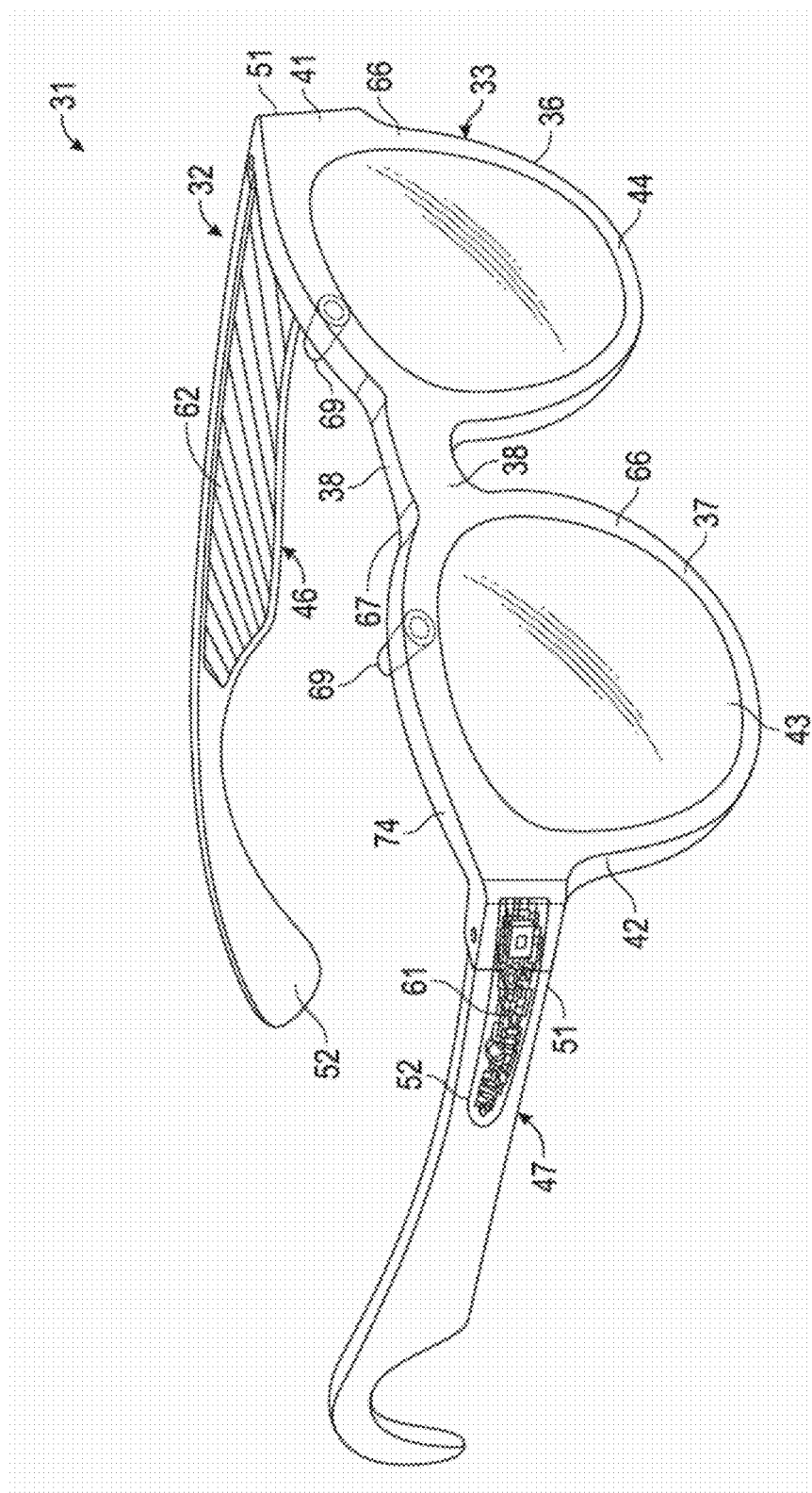
FIG. 11 is an example wearable device that may be used in association with some example embodiments.

FIG. 11 shows aspects of certain embodiments illustrated by a front perspective view of glasses 31. Glasses 31 may, in some embodiments, be a client companion device 114 that is used to capture images and to present augmented reality images to a user. In such embodiments, the location estimated using image based processed described herein would be performed by other devices to determine a location (including height, elevation, and any other perspective information) of the glasses 31 so that the virtual items in the augmented reality images will correctly be shown from the perspective appropriate to the position of glasses 31. The glasses 31 can include a frame 32 made from any suitable material such as plastic or metal, including any suitable shape memory alloy. The frame 32 can have a front piece 33 that can include a first or left lens, display, or optical element holder 36; and a second or right lens, display, or optical element holder 37 connected by a bridge 38. The front piece 33 additionally includes a left end portion 41 and a right end portion 42. A first or left optical element 44 and a second or right optical element 43 can be provided within respective left and right optical element holders 36, 37. Each of the optical elements 43, 44 can be a lens, a display, a display assembly, or a combination of the foregoing. Any of the display assemblies disclosed herein can be provided in the glasses 31.

Frame 32 additionally includes a left arm or temple piece 46 and a second arm or temple piece 47 coupled to the respective left and right end portions 41, 42 of the front piece 33 by any suitable means such as a hinge (not shown), so as to be coupled to the front piece 33, or rigidly or fixably secured to the front piece so as to be integral with the front piece 33. Each of the temple pieces 46 and 47 can include a first portion 51 that is coupled to the respective end portion 41 or 42 of the front piece 33 and any suitable second portion 52, such as a curved or arcuate piece, for coupling to the ear of the user. In one embodiment, the front piece 33 can be formed from a single piece of material, so as to have a unitary or integral construction.

Glasses 31 can include a computing device, such as computer 61, which can be of any suitable type so as to be carried by the frame 32 and, in one embodiment of a suitable size and shape, so as to be at least partially disposed in one of the temple pieces 46 and 47. In one embodiment, as illustrated in FIG. 1A, the computer 61 is sized and shaped similar to the size and shape of one of the temple pieces 46 and 47 and is thus disposed almost entirely if not entirely within the structure and confines of such temple pieces 46 and 47. In one embodiment, the computer 61 can be disposed in both of the temple pieces 46, 47. The computer 61 can include one or more processors with memory, wireless communication circuitry, and a power source. In certain embodiments, the computer 61 comprises low-power circuitry, high-speed circuitry, and a display processor. Various other embodiments may include these elements in different configurations or integrated together in different ways.

The computer 61 additionally includes a battery 62 or other suitable portable power supply. In one embodiment, the battery 62 is disposed in one of the temple pieces 46 or 47. In the glasses 31 shown in FIG. 11, the battery 62 is shown as being disposed in left temple piece 46 and electrically coupled using connection 74 to the remainder of the computer 61 disposed in the right temple piece 47. The one or more input and output devices can include a connector or port (not shown) suitable for charging a battery 62 accessible from the outside of frame 32, a wireless receiver, transmitter or transceiver (not shown), or a combination of such devices.

Glasses 31 include cameras 69. Although two cameras are depicted, other embodiments contemplate the use of a single or additional (i.e., more than two) cameras. In various embodiments, glasses 31 may include any number of input sensors or peripheral devices in addition to cameras 69. Front piece 33 is provided with an outward facing, forward-facing, or front or outer surface 66 that faces forward or away from the user when the glasses 31 are mounted on the face of the user, and an opposite inward-facing, rearward-facing, or rear or inner surface 67 that faces the face of the user when the glasses 31 are mounted on the face of the user. Such sensors can include inwardly-facing video sensors or digital imaging modules such as cameras that can be mounted on or provided within the inner surface 67 of the front piece 33 or elsewhere on the frame 32 so as to be facing the user, and outwardly-facing video sensors or digital imaging modules such as cameras 69 that can be mounted on or provided with the outer surface 66 of the front piece 33 or elsewhere on the frame 32 so as to be facing away from the user. Such sensors, peripheral devices, or peripherals can additionally include biometric sensors, location sensors, or any other such sensors. In additional embodiments, similar elements may be presented as visors, within helmet or google based systems, in vehicle HUD displays, or in any other such device.

Figure 12:
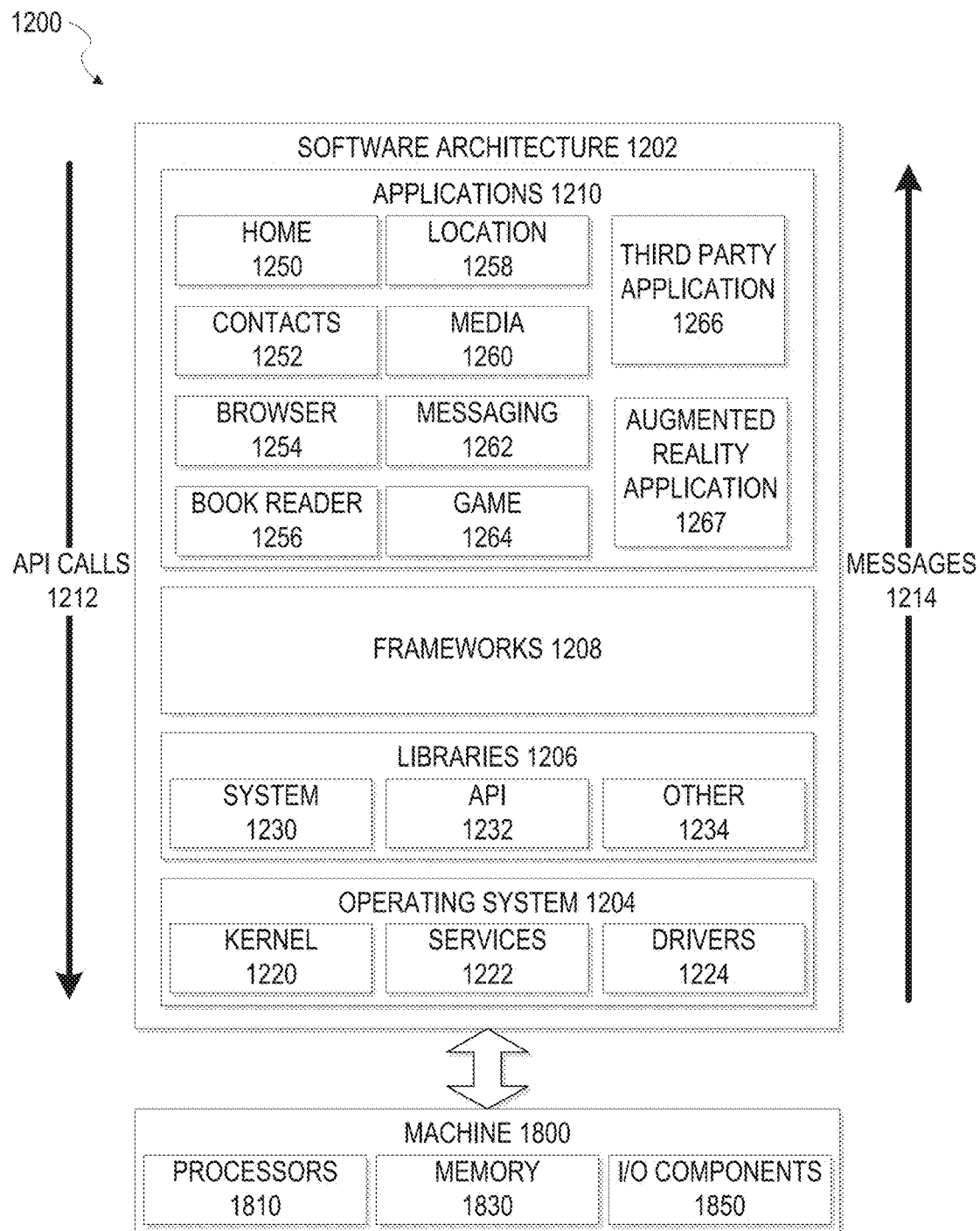
FIG. 12 is a block diagram illustrating an example of a software architecture that may be installed on a machine, according to some example embodiments.

FIG. 12 is a block diagram 1200 illustrating an architecture of software 1202, which can be installed on any one or more of the devices described above. FIG. 12 is merely a non-limiting example of a software architecture, and it will be appreciated that many other architectures can be implemented to facilitate the functionality described herein. In various embodiments, the software 1202 is implemented by hardware such as machine 1300 of FIG. 13 that includes processors 1310, memory 1330, and input/output (I/O) components 1350. In this example architecture, the software 1202 can be conceptualized as a stack of layers where each layer may provide a particular functionality. For example, the software 1202 includes layers such as an operating system 1204, libraries 1206, frameworks 1208, and applications 1210. Operationally, the applications 1210 invoke API calls 1212 through the software stack and receive messages 1214 in response to the API calls 1212, consistent with some embodiments. In one example, the advertisement selection system 160 operates as an application 1210.

In various implementations, the operating system 1204 manages hardware resources and provides common services. The operating system 1204 includes, for example, a kernel 1220, services 1222, and drivers 1224. The kernel 1220 acts as an abstraction layer between the hardware and the other software layers consistent with some embodiments. For example, the kernel 1220 provides memory management, processor management (e.g., scheduling), component management, networking, and security settings, among other functionality. The services 1222 can provide other common services for the other software layers. The drivers 1224 are responsible for controlling or interfacing with the underlying hardware, according to some embodiments. For instance, the drivers 1224 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1206 provide a low-level common infrastructure utilized by the applications 1210. The libraries 1206 can include system libraries 1230 (e.g., C standard library) that can provide functions such as memory allocation functions, string manipulation functions, mathematic functions, and the like. In addition, the libraries 1206 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1206 can also include a wide variety of other libraries 1234 to provide many other APIs to the applications 1210.

The frameworks 1208 provide a high-level common infrastructure that can be utilized by the applications 1210, according to some embodiments. For example, the frameworks 1208 provide various graphic user interface (GUI) functions, high-level resource management, high-level location services, and so forth. The frameworks 1208 can provide a broad spectrum of other APIs that can be utilized by the applications 1210, some of which may be specific to a particular operating system 1204 or platform.

In an example embodiment, the applications 1210 include a home application 1250, a contacts application 1252, a browser application 1254, a book reader application 1256, a location application 1258, a media application 1260, a messaging application 1262, a game application 1264, and a broad assortment of other applications such as a third party application 1266. According to some embodiments, the applications 1210 are programs that execute functions defined in the programs. Various programming languages can be employed to create one or more of the applications 1210, structured in a variety of manners, such as object-oriented programming languages (e.g., Objective-C, Java, or C++) or procedural programming languages (e.g., C or assembly language). In a specific example, the third party application 1266 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application 1266 can invoke the API calls 1212 provided by the operating system 1204 to facilitate functionality described herein.

An augmented reality application 1267 may implement any system or method described herein, including accessing map information, processing image an façade data matching, or any other operation described herein. Further, in some embodiments, messaging application 1262 and augmented reality application 1267 may operate together as part of an ephemeral messaging application. Such an ephemeral messaging application may operate to generate images, allow users to add augmented reality elements to the images, and communicate some or all of the images and/or augmented reality data to another system user. After a deletion trigger has been met, the sent data is communicated from the receiving user's system, and may also be synchronized to delete the images and/or augmented reality data from any server involved in communication of the ephemeral message that included the image and/or the augmented reality data. In some embodiments, the trigger for deletion of data from a receiving user's device may be a timer that indicates how long an augmented reality image is displayed for. In other embodiments, the ephemeral messaging system may have set date and time triggers for deletion, or deletion associated with a number of times that a receiving user has accessed the data.

For example, in one embodiment, a user may send a set of augmented reality data to another user via an ephemeral messaging system. The ephemeral messaging data may include an emoji sticker object attached to a geolocation. When a receiving user's device receives the ephemeral message, the emoji will be available for viewing within an augmented reality system with limitations set by the ephemeral messaging system. After a limitation trigger has been met, the emoji sticker will no longer be available for viewing. In other embodiments, a user may select an ephemeral or non-ephemeral status for such a message including augmented reality data, such that a non-ephemeral message including the data will wait for a selection from a receiving user to delete the augmented reality data, and the augmented reality data that is part of the message may be stored on a communication server indefinitely.

Figure 13:
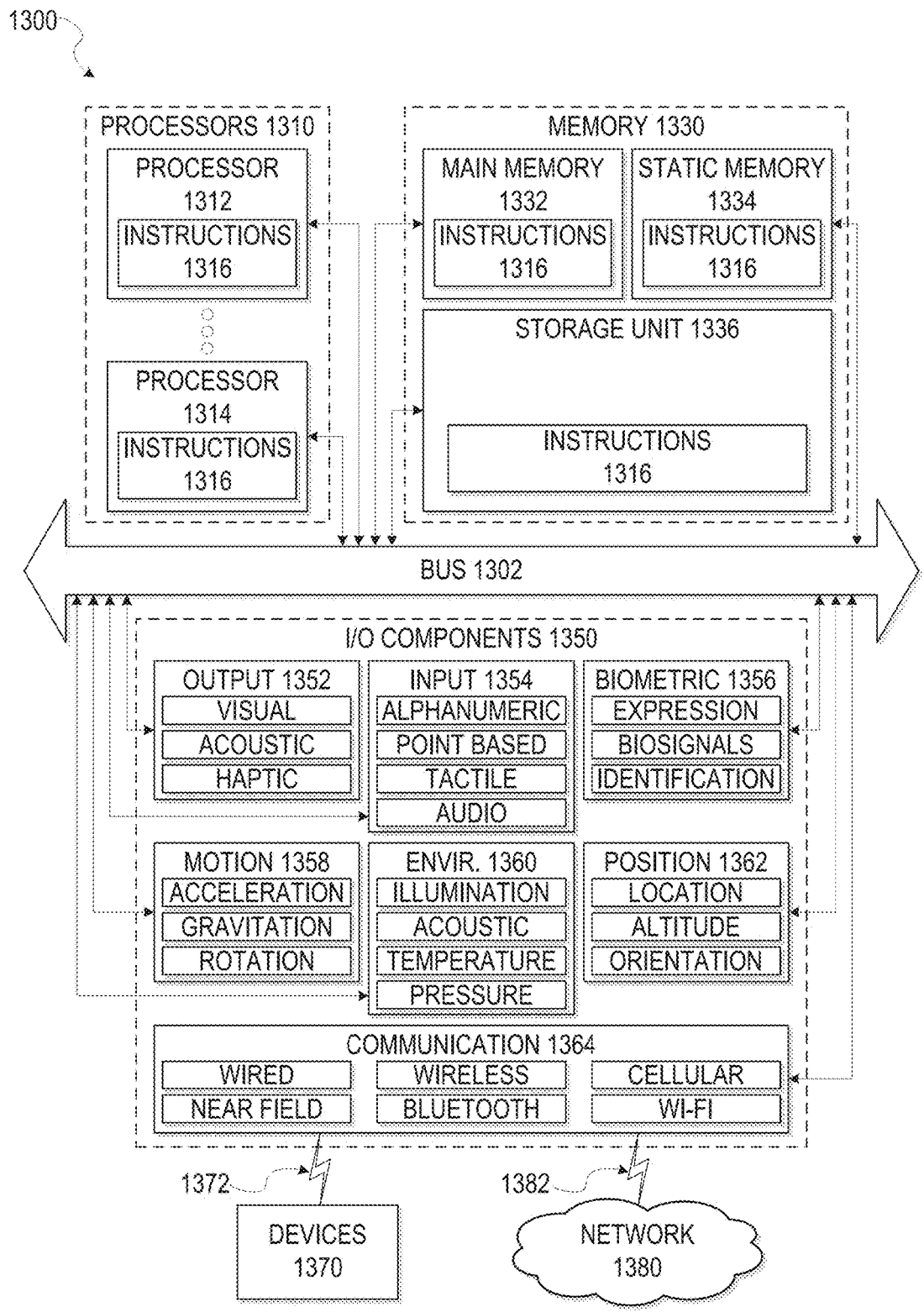
FIG. 13 is a block diagram presenting a diagrammatic representation of a machine in the form of a computer system within which a set of instructions may be executed for causing the machine to perform any of the methodologies discussed herein, according to an example embodiment.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein can be executed. Additionally, or alternatively, the instruction can implement any module of FIG. 2, and so forth. The instructions transform the general, non-programmed machine into a particular machine programmed to carry out the described and illustrated functions in the manner described. In alternative embodiments, the machine 1300 operates as a standalone device or can be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 can comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 can include processors 1310, memory/storage 1330, and I/O components 1350, which can be configured to communicate with each other such as via a bus 1302. In an example embodiment, the processors 1310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, processor 1312 and processor 1314 that may execute instructions 1316. The term "processor" is intended to include multi-core processor that may comprise two or more independent processors (sometimes referred to as "cores") that can execute instructions contemporaneously. Although FIG. 13 shows multiple processors, the machine 1300 may include a single processor with a singly, core, a single processor with multiple cores (e.g., a multi-core processor), multiple processors with a single core, multiple processors with multiples cores, or any combination thereof.

The memory/storage 1330 can include a main memory 1332, a static memory 1334, or other memory storage, and a storage unit 1336, both accessible to the processors 1310 such as via the bus 1302. The storage unit 1336 and memory 1332 store the instructions 1316 embodying any one or more of the methodologies or functions described herein. The instructions 1316 can also reside, completely or partially, within the memory 1332, within the storage unit 1336, within at least one of the processors 1310 (e.g., within the processor's cache memory), or any suitable combination thereof, during execution thereof by the machine 1300. Accordingly, the memory 1332, the storage unit 1336, and the memory of the processors 1310 are examples of machine-readable media.

As used herein, the term "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 1316. The term "machine-readable medium" shall also be taken to include any medium, or combination of multiple media, that is capable of storing instructions (e.g., instructions 1316) for execution by a machine (e.g., machine 1300), such that the instructions, when executed by one or more processors of the machine 1300 (e.g., processors 1310), cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1350 can include a wide variety of components to receive input, provide output, produce output, transmit information, exchange information, capture measurements, and so on. The specific components 1350 that are included in a particular machine will depend on the type of machine. For example, portable machines such as mobile phones will likely include a touch input device or other such input mechanisms, while a headless server machine will likely not include such a touch input device. It will be appreciated that the I/O components 1350 can include many other components that are not shown in FIG. 13. The I/O components 1350 are grouped according to functionality merely for simplifying the following discussion and the grouping is in no way limiting. In various example embodiments, the I/O components 1350 can include output components 1352 and input components 1354. The output components 1352 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1354 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 1350 can include biometric components 1356, motion components 1358, environmental components 1360, or position components 1362 among a wide array of other components. For example, the biometric components 1356 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 can include acceleration sensor components (e.g., an accelerometer), gravitation sensor components, rotation sensor components (e.g., a gyroscope), and so forth. The environmental components 1360 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1362 can include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 include a network interface component or other suitable device to interface with the network 1380. In further examples, communication components 1364 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1370 may be another machine or any of a wide variety of peripheral devices (e.g., a peripheral device coupled via a USB).

Moreover, the communication components 1364 can detect identifiers or include components operable to detect identifiers. For example, the communication components 1364 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1364, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1380 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or other type of cellular or wireless coupling. In this example, the coupling 1382 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1316 can be transmitted or received over the network 1380 using a transmission medium via a network interface device (e.g., a network interface component included in the communication components 1364) and utilizing any one of a number of well-known transfer protocols (e.g., HTTP). Similarly, the instructions 1316 can be transmitted or received using a transmission medium via the coupling 1372 (e.g., a peer-to-peer coupling) to devices 1370. The term "transmission medium" shall be taken to include any intangible medium that is capable of storing, encoding, or carrying the instructions 1316 for execution by the machine 1300, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method for determining a device location comprising:

capturing, by an image sensor of the device, a first image of an environment;

accessing building location information describing one or more location points for at least a first building, wherein the building location information is associated with a first position estimate of the device;

processing the first image of the environment using the building location information, to identify a match between a first wall portion of the first image of the environment and the one or more location points of the building location information; and calculating, based at least n part on a perspective associated with the first wall portion of the first image of the environment and the match between the first wall portion and the one or more location points, a second position estimate of the device.

2. The method of claim 1, further comprising determining, using a global positioning system GPS) module the device, the first position estimate for the device.

3. The method of claim 2 further comprising, prior to the accessing of the building location information:

capturing a plurality of model images of the environment;

capturing a model location for each of the plurality of model images of the environment; and processing the plurality of model images and the model location for each of the plurality of model images to generate a database of building location points comprising the one or more location points for the building;

wherein the one or more location points as processed describe one or more façade surface locations and a two-dimensional façade pattern.

4. The method of claim 3, further comprising:

receiving, at the device, in response to the first position estimate, the building location information, wherein the one or more location points of the building location information comprises one or more façade surface locations and a two-dimensional façade pattern;

wherein identifying the first wall portion of the first image comprises:

calculating, from the first position estimate and the one or more façade surface locations, an expected perspective for the two-dimensional façade pattern;

processing the two-dimensional façade pattern to generate a first perspective pattern;

processing the first image of the environment using the first perspective pattern to identify the first wall portion.

5. The method of claim 4, wherein calculating, based at least in part on a perspective of the first wall portion of the first image of the environment, the second position estimate of the device, comprises:

calculating an error value between the first perspective pattern and the first wall portion of the first image;

determining a relative location value associated with the error value; and determining the second position estimate from the first position estimate using the relative location value.

6. The method of claim 5, further comprising:

accessing a set of augmented reality image data associated with an augmented reality image item;

capturing, by the image sensor, a second image of the environment;

calculating a position for the augmented reality image item using the second position estimate;

generating an augmented reality image using the second image, the set of augmented reality image data, and the second position estimate; and outputting the augmented reality image on a display of the device.

7. The method of claim 3, wherein identifying the first wall portion of the first image comprises:

calculating, from the first position estimate and the one or more façade surface locations, an expected perspective for the two-dimensional façade pattern;

processing the two-dimensional façade pattern to generate a first perspective pattern;

determining that the first perspective pattern does not meet a threshold match level for the first image;

requesting a supplemental set of façade data from a first server computer; and receiving the supplemental set of façade data from the first server computer;

wherein the identifying of the first wall portion is based on the supplemental set of façade data.

8. The method of claim 7, wherein requesting the supplemental set of façade data from the first server computer comprises communicating the first image of the environment to the first server computer; and wherein receiving the supplemental set of façade data comprises receiving a supplemental position estimate from the first server computer based on the first image.

9. The method of claim 8, further comprising:

capturing a second image of the environment;

identifying a first surface of the second image; and calculating a perspective difference between the first surface of the second image and the first wall portion of the first image; and generating a third position estimate using the second position estimate and the perspective difference.

10. The method of claim 7 further comprising:

receiving, at the device, two-dimensional augmented reality data for a sticker object;

determining an augmented realty placement of the sticker object as positioned on a plane with the one or more façade surface locations;

using the expected perspective for the two-dimensional façade pattern as a sticker object perspective; and generating an augmented reality image comprising the sticker object on the plane with the one or more façade surface locations based on the expected perspective.

11. The embodiment of claim 10 wherein the two-dimensional augmented reality data represents an emoji object selected by a user input from a set of augmented reality system pictograms.

12. The method of claim 1, further comprising:

identifying, using the building location information, a second surface of the first image of the environment, wherein the second surface matches second location points of the building location information;

wherein the second position estimate is further calculating based at least in part on a second perspective of the second surface of the first image of the environment.

13. The method of claim 12, further comprising:

updating the building location information using the first image and the second image to adjust the one or more façade surface locations and the two-dimensional façade pattern.

14. The method of claim 13, further comprising:

communicating at least a portion of the first image and at least a portion of the second age to the first server computer with the second location estimate and the third location estimate.

15. A system comprising:

a memory configured to store an image of an environment and building location information describing one or more location points for at least a first building, wherein the building location information is associated with a first position estimate of the device; and one or more processors coupled to the memory and configured to perform operations comprising:

accessing the image and the building location information;

processing the image of the environment using the building location information to identify a match between a first wall portion of the first image of the environment and the one or more location points of the building location information; and calculating, based at least in part on a perspective associated with the first wall portion of the image of the environment and the match between the first wall portion and the one or more location points, a second position estimate of the device.

16. The system of claim 15, further comprising:

a first wearable device comprising an image sensor configured to capture the first image and a first wireless input/output (I/O) module; and a first client device comprising the first positioning module, the image based location system module, and a second wireless I/O module, wherein the first client device accesses the first image via the first wireless I/O module of the first wearable device.

17. The system of claim 16 wherein the first wearable device comprises a device selected from the set of: an augmented reality helmet, an augmented reality visor, glasses, and an augmented reality glasses attachment; and wherein the second client device comprises a smartphone.

18. A non-transitory computer readable medium comprising instructions that, when performed by a device, cause the device to perform a method comprising:

accessing building location information describing one or more location points for at least a first building associated with a first position estimate of the device;

accessing a first image of an environment;

processing the image of the environment using the building location information to identify a match between a first well portion of the first image of the environment and the one or more location points of the building location information; and calculating, based at least in part perspective associated with the first wall portion of the image of the environment and the match between the first wall portion and the one or more location points, a second position estimate of the device.

19. The non-transitory computer readable medium of claim 18 wherein the one or more location points of the building location information comprises one or more façade surface locations and a two-dimensional façade pattern associated with the first wall portion; and wherein identifying the first wall portion of the first image comprises:

calculating, from the first position estimate and the one or more façade surface locations, an expected perspective for the two-dimensional façade pattern;

processing the two-dimensional façade pattern to generate a first perspective pattern;

processing the first image of the environment using the first perspective pattern to identify the first wall portion of the first image.

20. The non-transitory computer readable medium of claim 19 wherein the instructions further cause the device to perform a method comprising:

receiving a set of augmented reality data;

determining position and perspective information for the augmented reality data based on the second position estimate;

generating an augmented reality image using the set of augmented reality data, the position and perspective information, and the second position estimate; and outputting the augmented reality image to a display of the device.

* * * * *